United States Patent
Yi et al.

(10) Patent No.: US 10,959,271 B2
(45) Date of Patent: Mar. 23, 2021

(54) METHOD AND APPARATUS FOR PERFORMING RANDOM ACCESS PROCEDURE IN WIRELESS COMMUNICATION SYSTEM

(71) Applicant: LG Electronics Inc., Seoul (KR)

(72) Inventors: Yunjung Yi, Seoul (KR); Kijun Kim, Seoul (KR); Byounghoon Kim, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/478,267

(22) PCT Filed: Oct. 24, 2018

(86) PCT No.: PCT/KR2018/012651
§ 371 (c)(1),
(2) Date: Jul. 16, 2019

(87) PCT Pub. No.: WO2019/083277
PCT Pub. Date: May 2, 2019

(65) Prior Publication Data
US 2019/0364602 A1 Nov. 28, 2019

Related U.S. Application Data

(60) Provisional application No. 62/593,990, filed on Dec. 3, 2017, provisional application No. 62/593,131, filed
(Continued)

(51) Int. Cl.
*H04W 74/08* (2009.01)
*H04W 72/04* (2009.01)

(52) U.S. Cl.
CPC ....... *H04W 74/0833* (2013.01); *H04W 72/04* (2013.01)

(58) Field of Classification Search
None
See application file for complete search history.

(56) References Cited

U.S. PATENT DOCUMENTS

2014/0056243 A1* 2/2014 Pelletier ............ H04W 72/1268 370/329
2018/0279193 A1* 9/2018 Park ........................ H04W 76/27
(Continued)

FOREIGN PATENT DOCUMENTS

EP 3461026 3/2019
WO WO2015012666 1/2015

OTHER PUBLICATIONS

Huawei et al., R2-1710217, User plane impacts for Bandwidth Parts, 3GPP TSG RAN WG2 #99bis, 3GPP(Sep. 29, 2017) See pp. 1-5. (Year: 2017).*

(Continued)

*Primary Examiner* — Robert M Morlan
(74) *Attorney, Agent, or Firm* — Fish & Richardson P.C.

(57) ABSTRACT

A method and apparatus for performing a random access procedure in a wireless communication system is provided. A user equipment (UE) triggers the random access procedure. When a physical random access channel (PRACH) resource is not in an active uplink (UL) bandwidth part (BWP), the UE switches the active UL BWP to an initial UL BWP, and switches an active DL BWP to an initial DL BWP. When the PRACH resource is in the active UL BWP, the UE switches the active DL BWP to a DL BWP which is paired with the active UL BWP.

15 Claims, 17 Drawing Sheets

Related U.S. Application Data on Nov. 30, 2017, provisional application No. 62/592,324, filed on Nov. 29, 2017, provisional application No. 62/591,685, filed on Nov. 28, 2017, provisional application No. 62/590,340, filed on Nov. 23, 2017, provisional application No. 62/588,884, filed on Nov. 20, 2017, provisional application No. 62/588,274, filed on Nov. 17, 2017, provisional application No. 62/579,085, filed on Oct. 30, 2017, provisional application No. 62/576,585, filed on Oct. 24, 2017.

(56) References Cited

U.S. PATENT DOCUMENTS

| | | | | |
|---|---|---|---|---|
| 2018/0279262 | A1* | 9/2018 | Babaei | H04W 72/04 |
| 2019/0098655 | A1* | 3/2019 | Shih | H04B 7/0617 |
| 2019/0281539 | A1* | 9/2019 | Takeda | H04L 5/0053 |
| 2020/0344030 | A1* | 10/2020 | Cheng | H04W 74/0833 |

OTHER PUBLICATIONS

MediaTek Inc., R1-1718839, Summary of Bandwidth Part Operation, 3GPP TSG RAN WG1 #90bis, 3GPP (Oct. 9, 2017) See pp. 1, 6, 13 (Year: 2017).*

NTT DOCOMO INC. (Rapporteur), R2-1710077, RAN WG's progress on NR WI in the Aug. and Sep. meetings 2017, 3GPP TSG RAN WG2 #99bis, 3GPP (Oct. 6, 2017) See pp. 32, 43, 60, 61 (Year: 2017).*

Nokia et al., R1-1718607, On remaining aspects of BWPs, 3GPP TSG RAN WG1 #90bis, 3GPP (Oct. 2, 2017) See pp. 1-3. (Year: 2017).*

Nokia, Nokia Shanghai Bell, "On remaining aspects of BWPs," R1-1718607, 3GPP TSG-RAN WG1 Meeting #90bis, Prague, CZ, dated Oct. 2, 2017, 7 pages.

MediaTek Inc., "Summary of Bandwidth Part Operation," R1-1718839, 3GPP TSG RAN WG1 Meeting 90bis, Prague, CZ, dated Oct. 9, 2017, 15 pages.

NTT DOCOMO, INC. (Rapporteur), RAN WG's progress on NR WI in the Aug. and Sep. meetings 2017, R2-1710077, 3GPP TSG-RAN WG2 #99bis, Prague, Czech Republic, dated Oct. 6, 2017, 122 pages.

Huawei, HiSilicon, "User plane impacts for Bandwidth Parts," R2-1710217, 3GPP TSG-RAN WG2 #99bis, Prague, CZ, dated Sep. 29, 2017, 8 pages.

NTT DOCOMO, INC., "Work plan for Rel-15 NR WI," R1-1718177, 3GPP TSG RAN WG1 Meeting #90bis, Prague, CZ, Oct. 9-13, 2017, 176 pages.

Korean Office Action in Korean Appln. No. 10-2019-7020152, dated Jun. 4, 2020, 11 pages (with English translation).

Extended European Search Report in European Appln. No. 18871355.6, dated Sep. 9, 2020, 18 pages.

Huawei, HiSilicon, "Coexistence of different UE types on a wideband carrier," R1-1715570, 3GPP TSG RAN WG1 Meeting NR#3, Nagoya, Japan, Sep. 18-21, 2017, 6 pages.

LG Electronics, "RMSI delivery and CORESET configuration," R1-1715842, 3GPP TSG RAN WG1 Meeting NR#3, Nagoya, Japan Sep. 18-21, 2017, 7 pages.

Panasonic, "Numerology for Msg2 and Msg4 for RRC_Connected UEs," R1-1718764, 3GPP TSG-RAN WG1 Meeting 90bis, Prague, CZ, Oct. 9-13, 2017, 4 pages.

* cited by examiner

[Fig. 1]
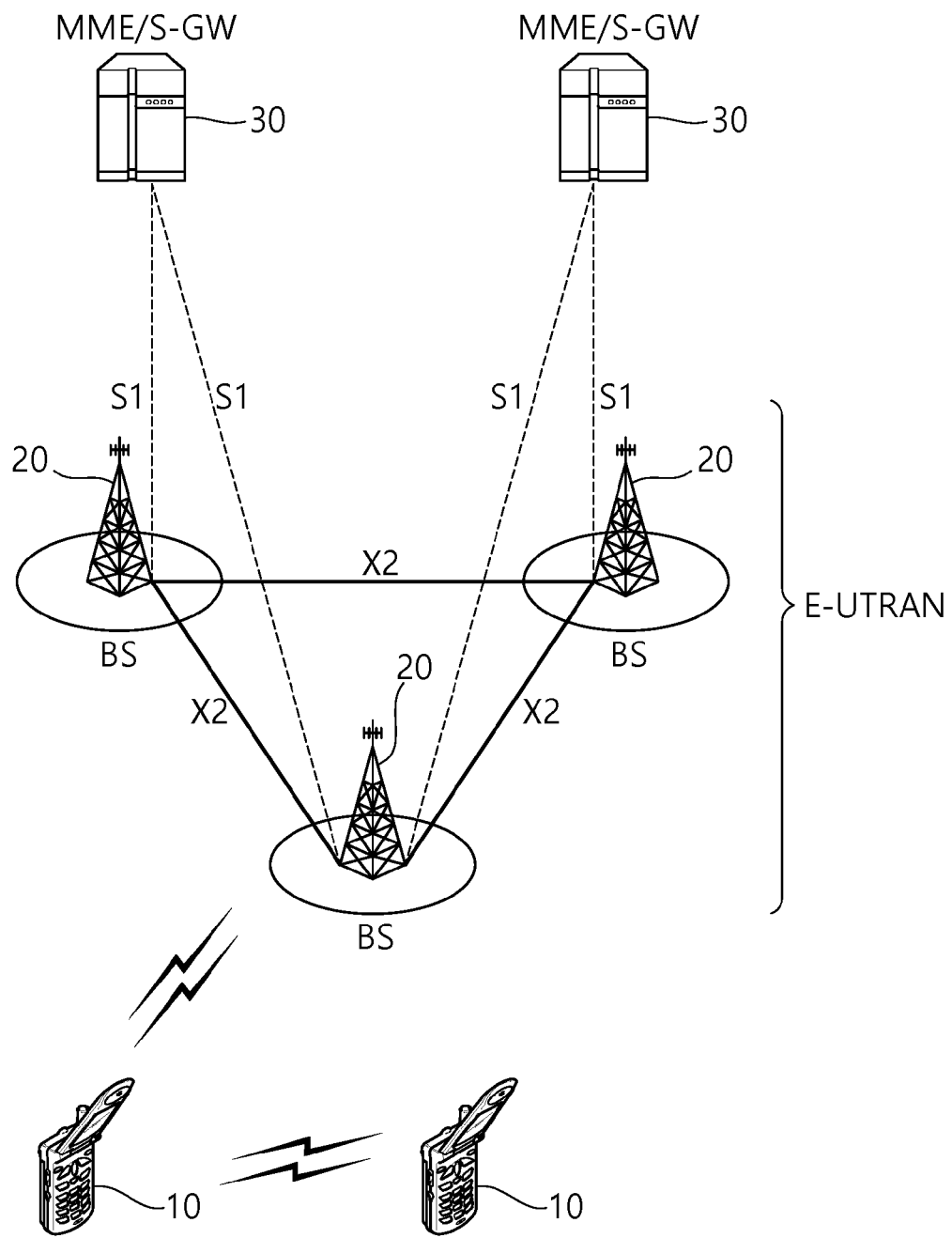

[Fig. 2]
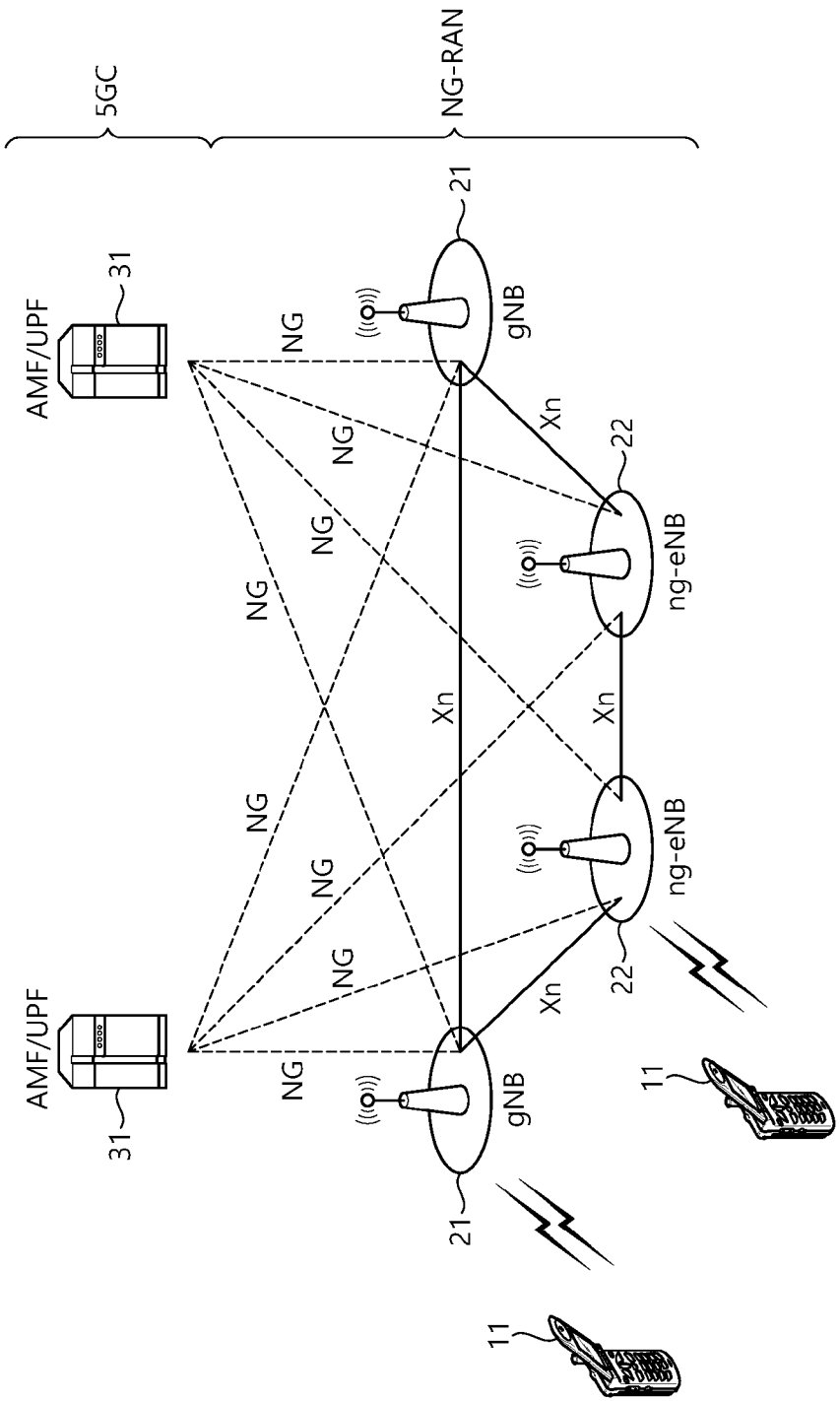

[Fig. 3]
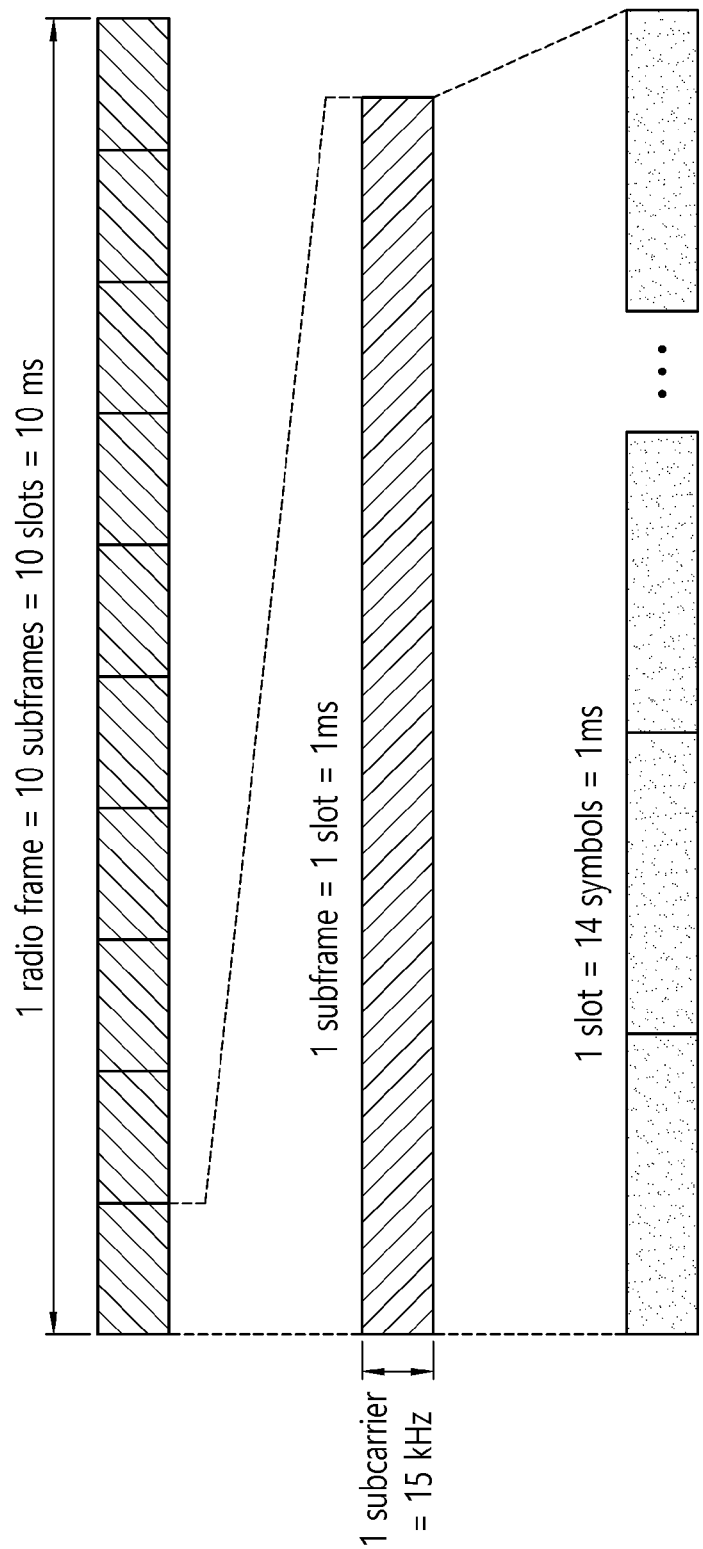

[Fig. 4]
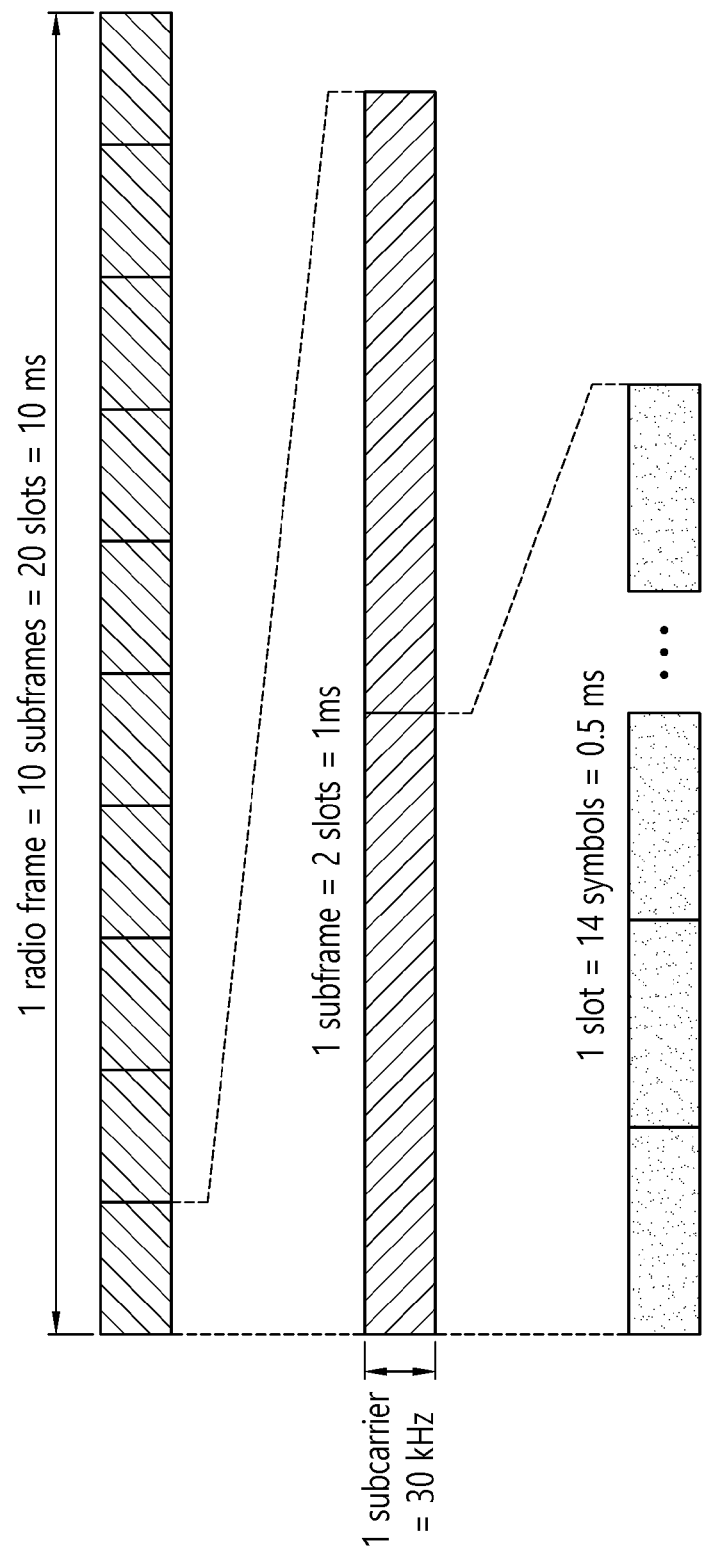

[Fig. 5]
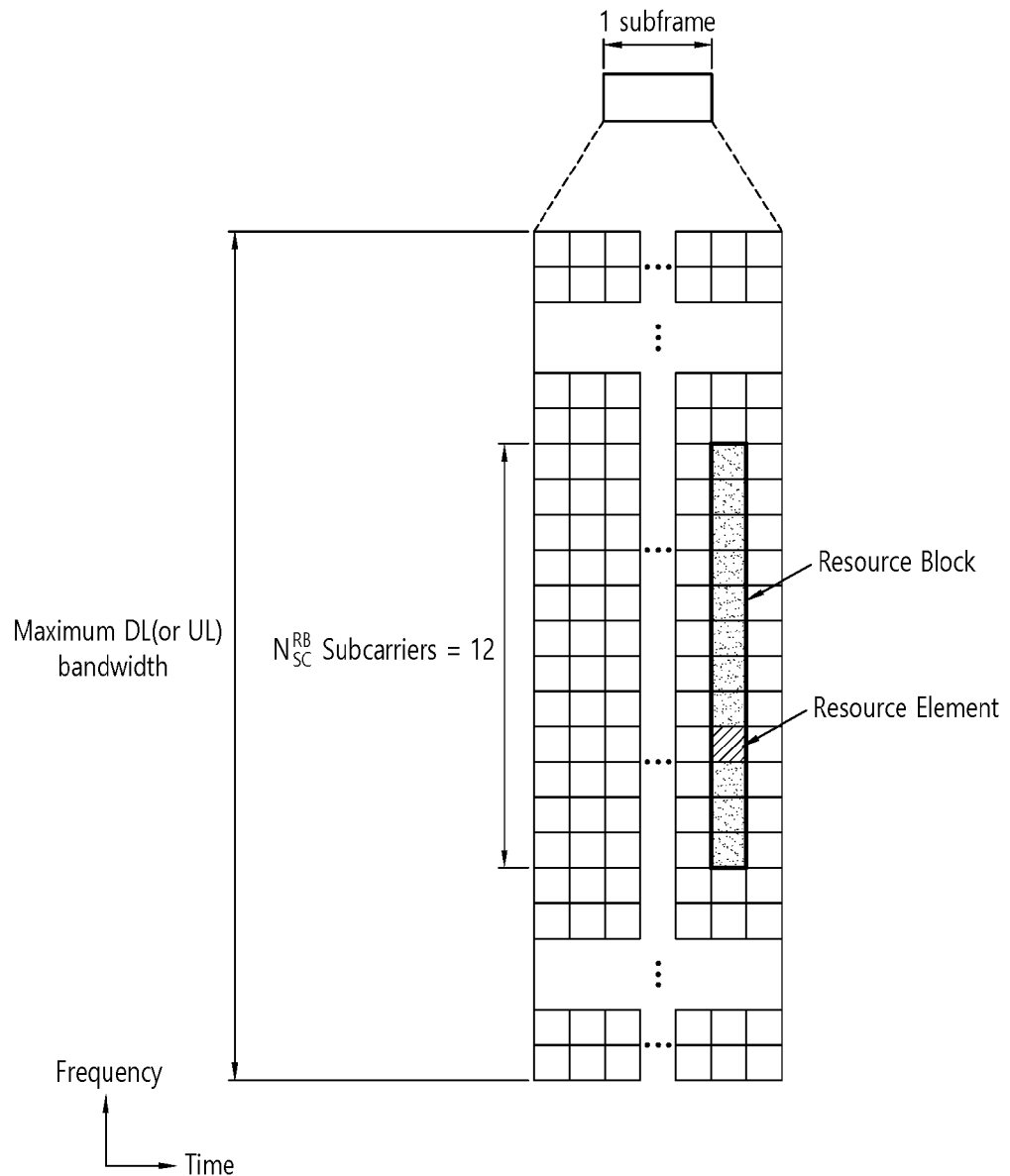

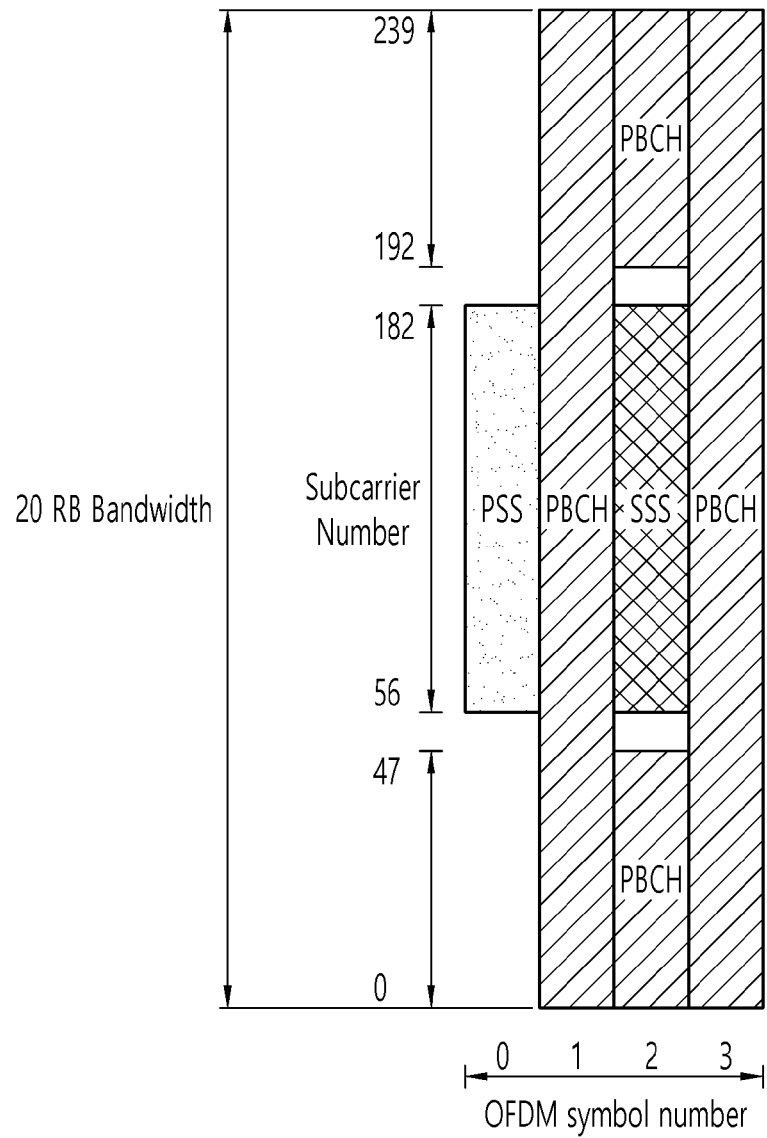
[Fig. 6]

[Fig. 7]
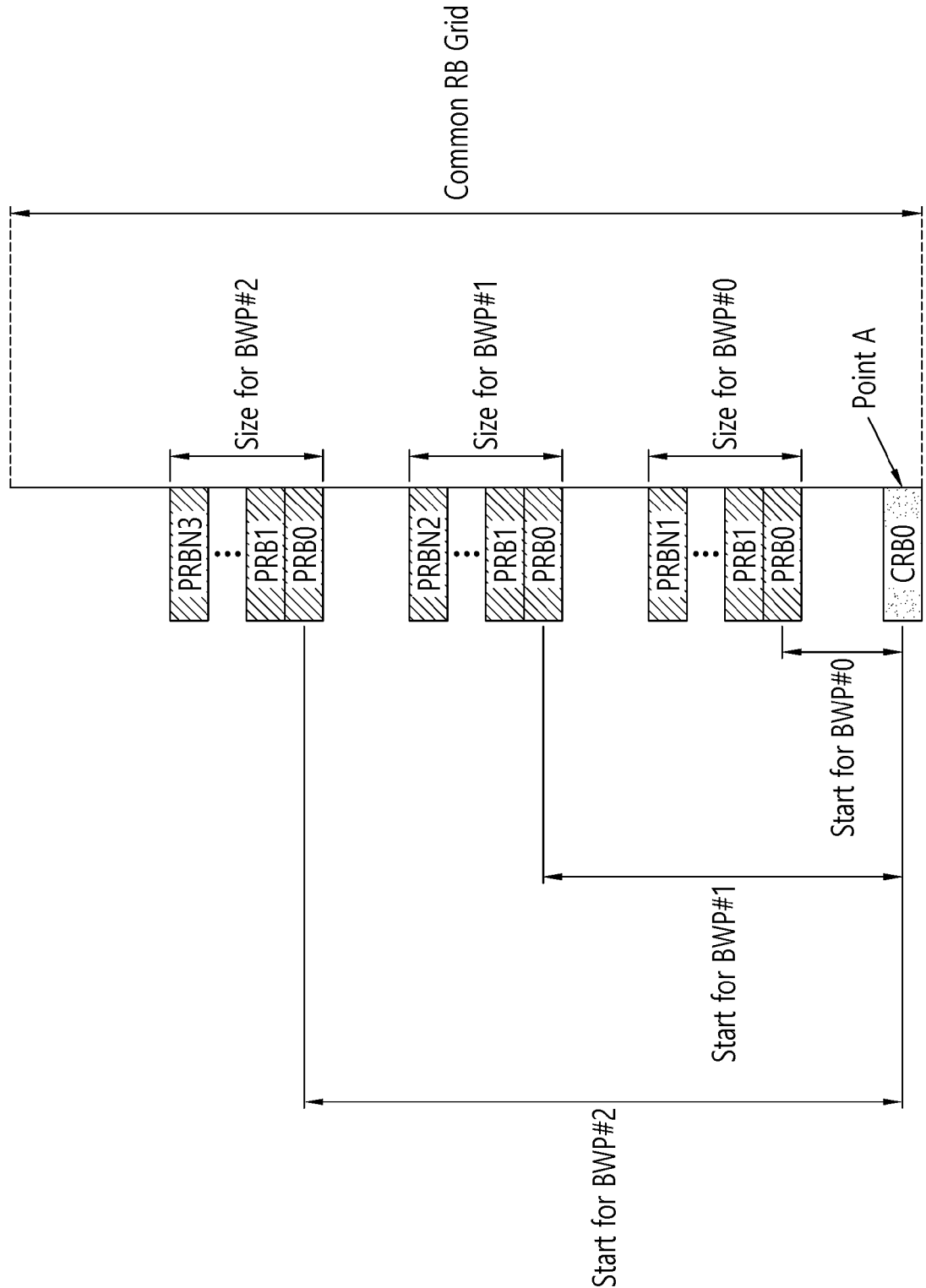

[Fig. 8]
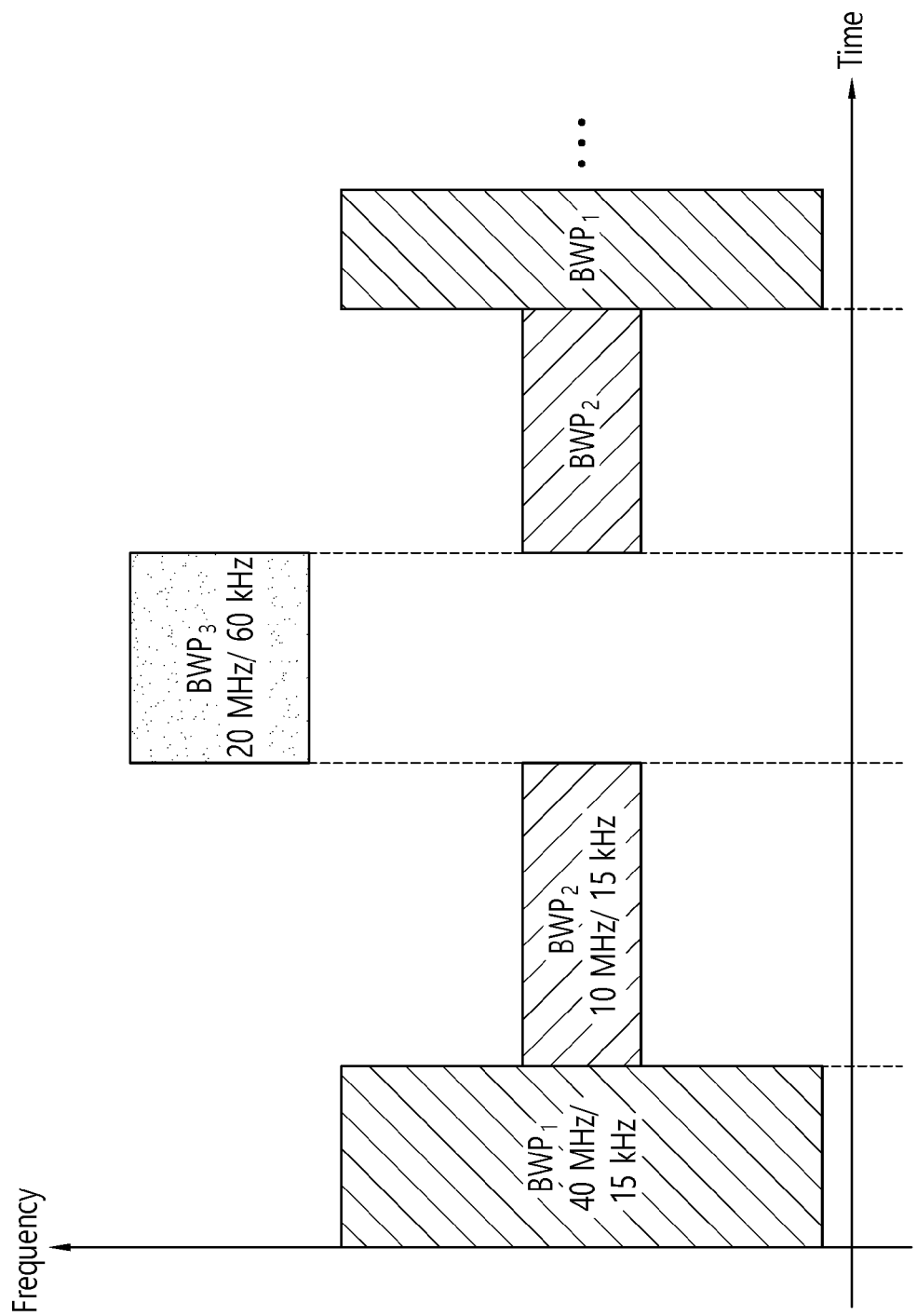

[Fig. 9]
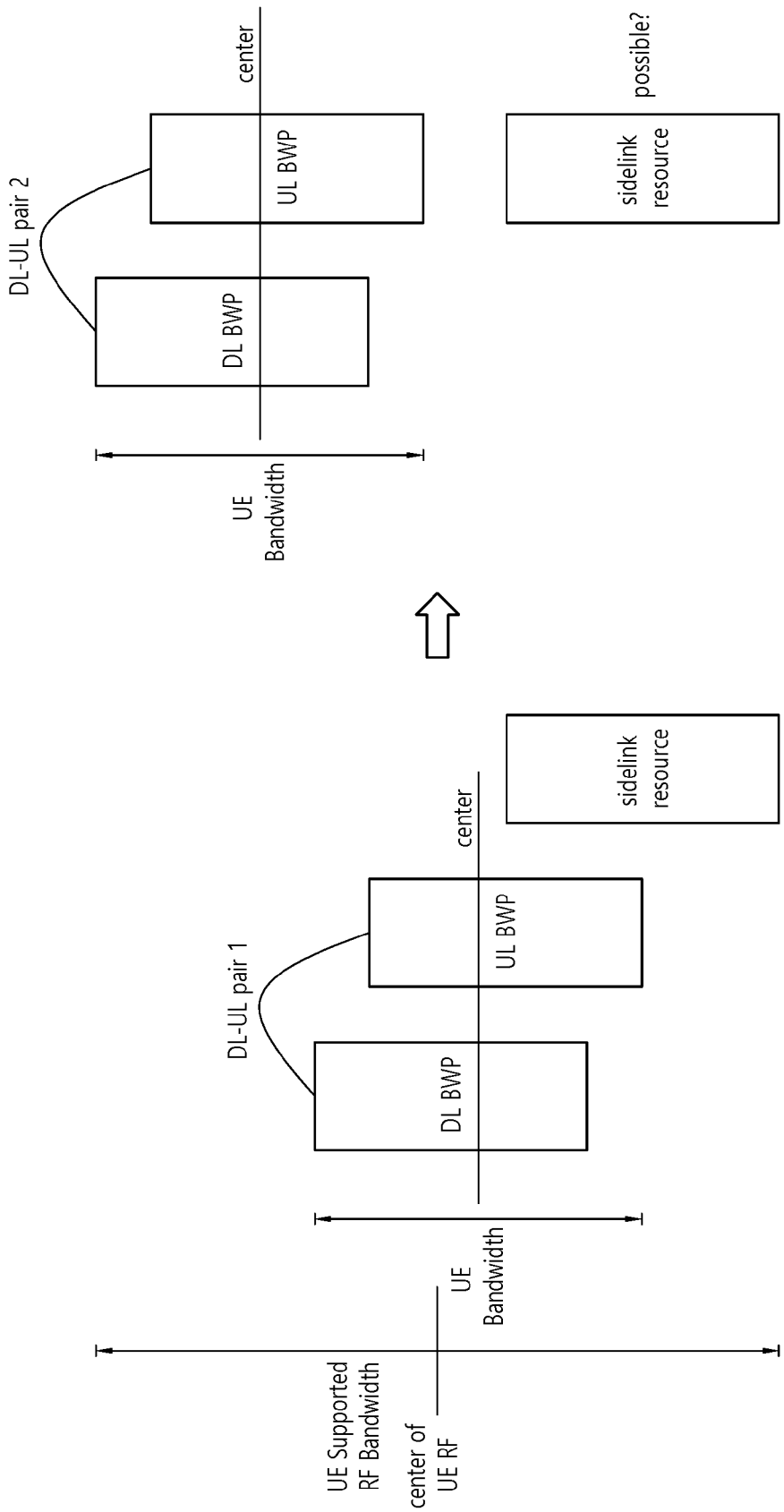

[Fig. 10]
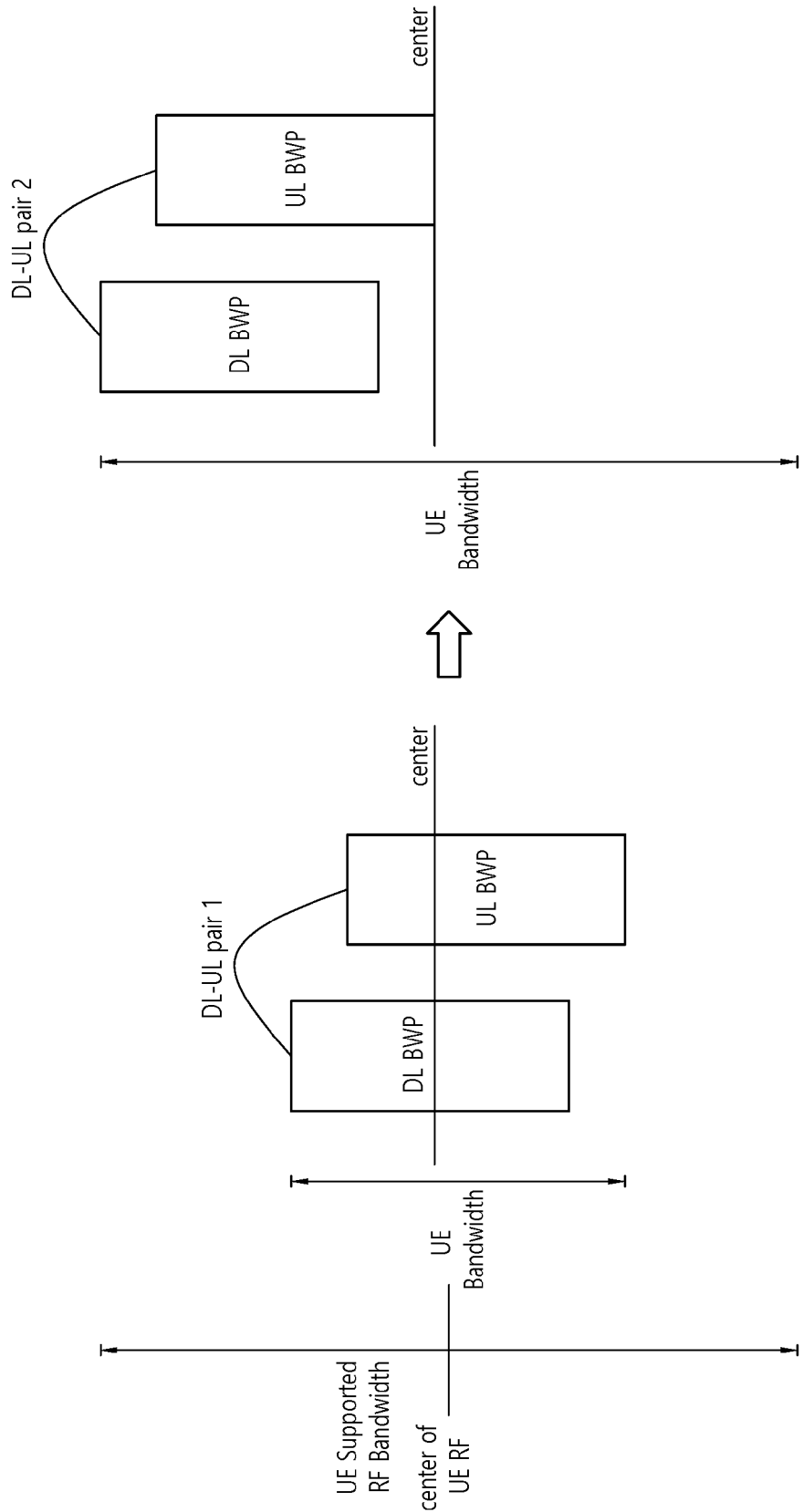

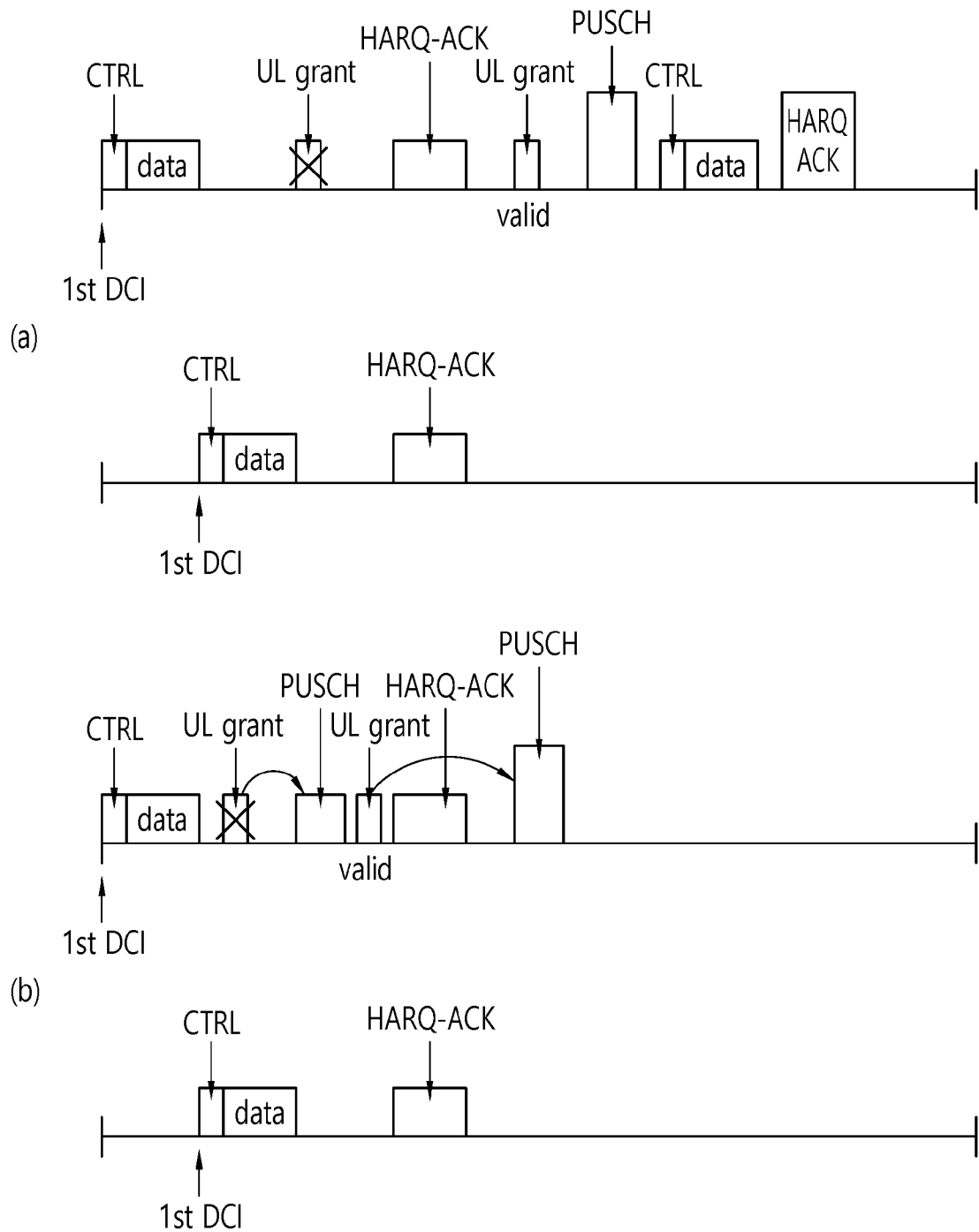
[Fig. 11]

[Fig. 12]
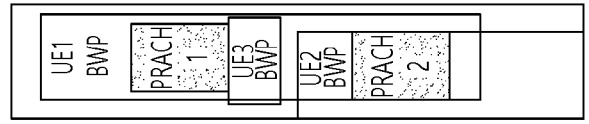
(b)
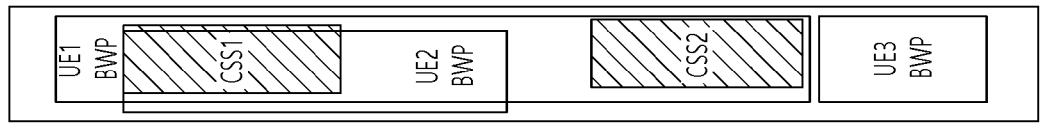
(a)
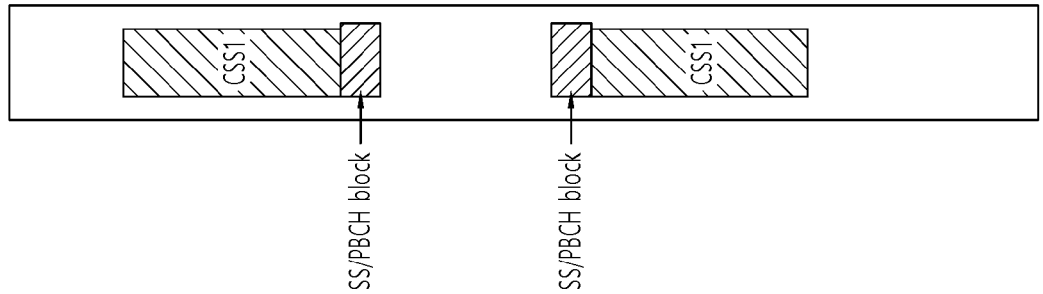

[Fig. 13]
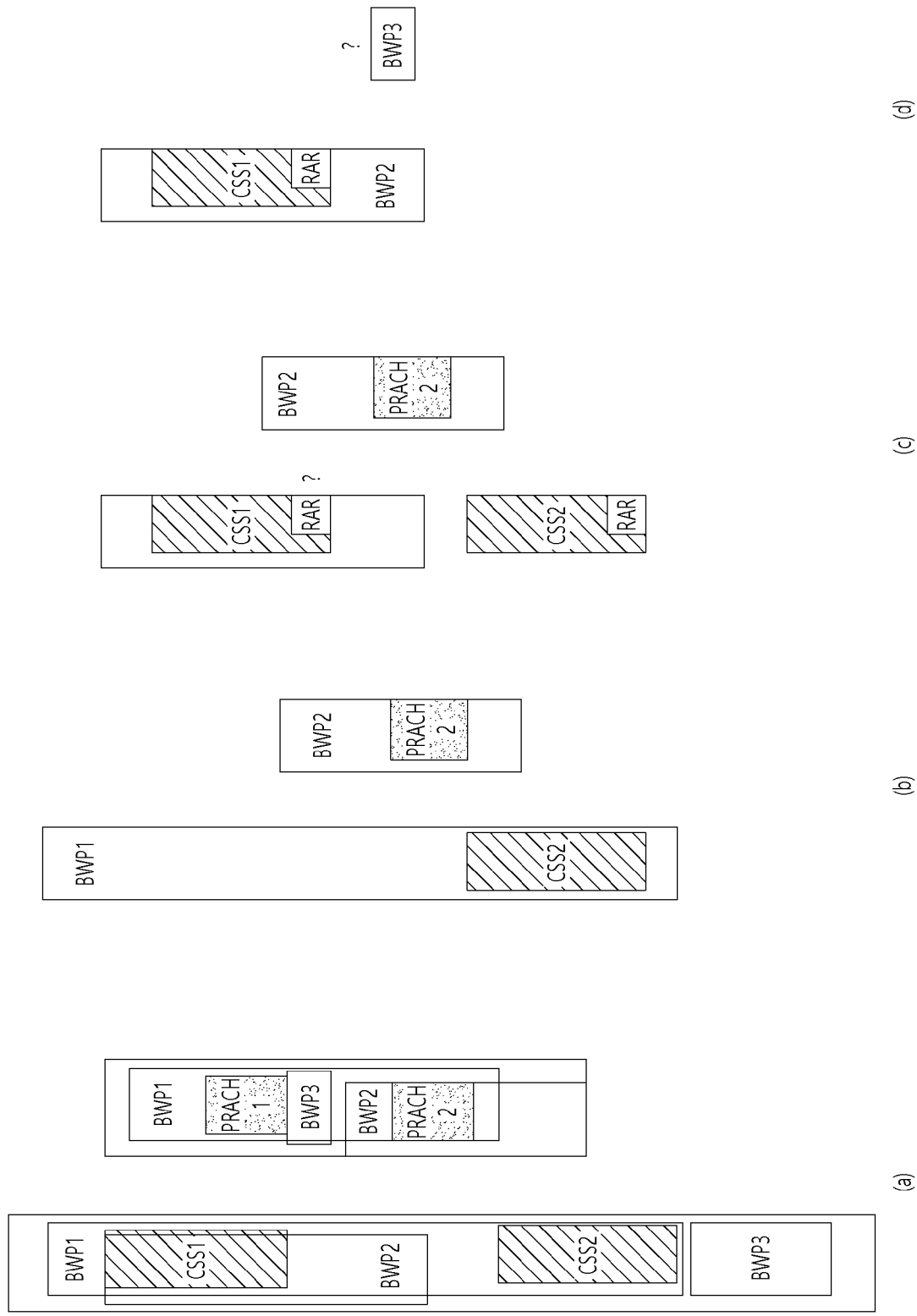

[Fig. 14]
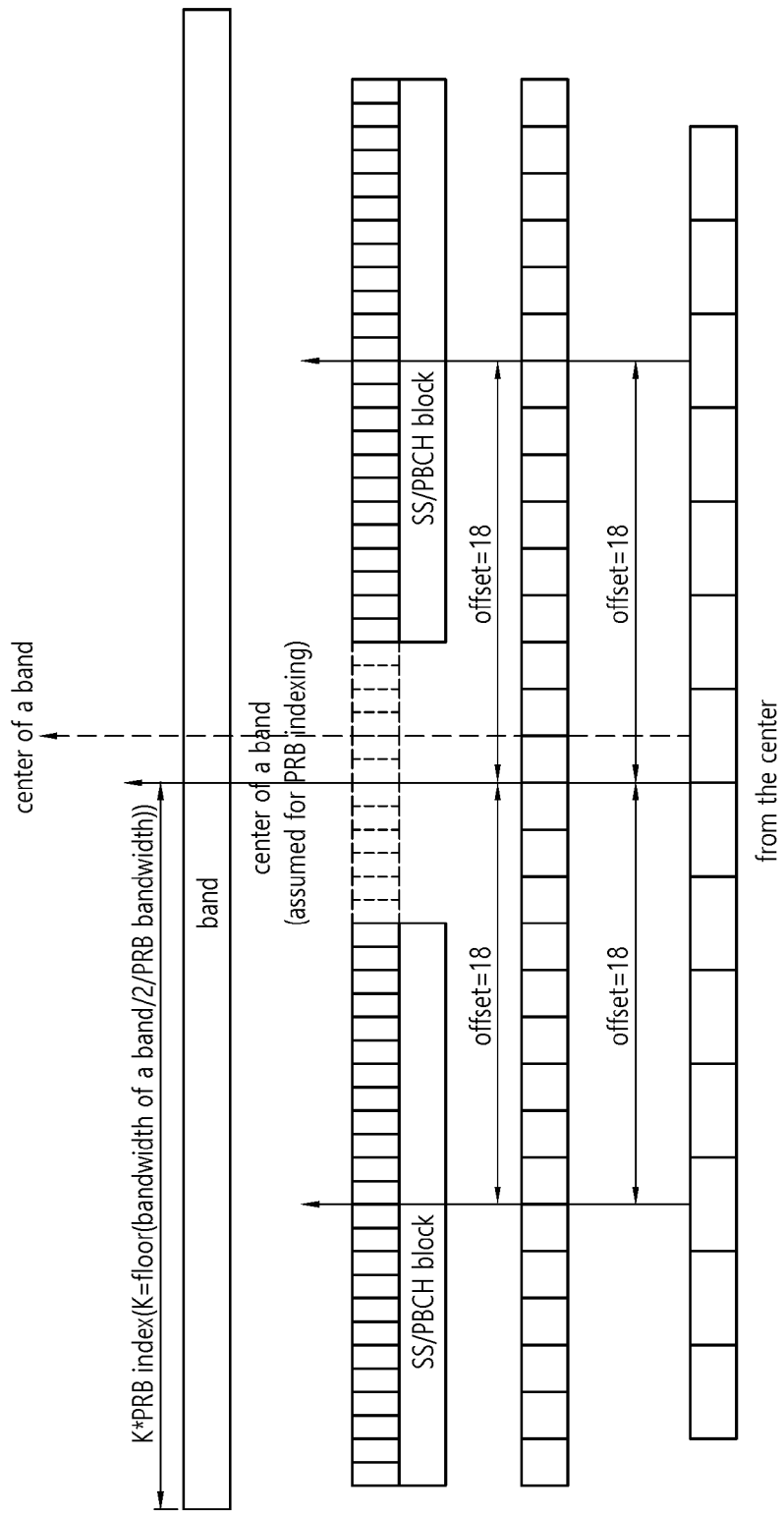

[Fig. 15]
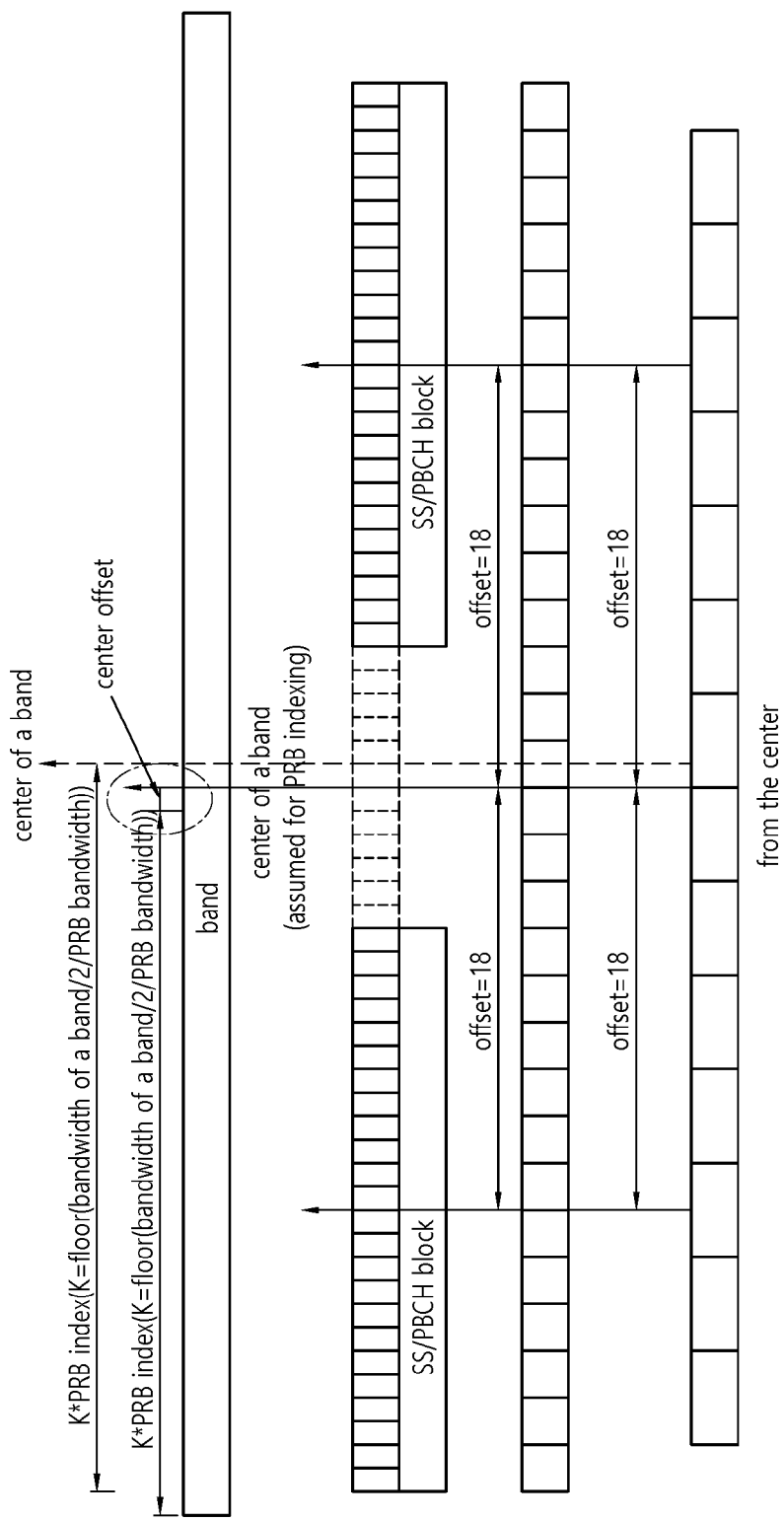

[Fig. 16]
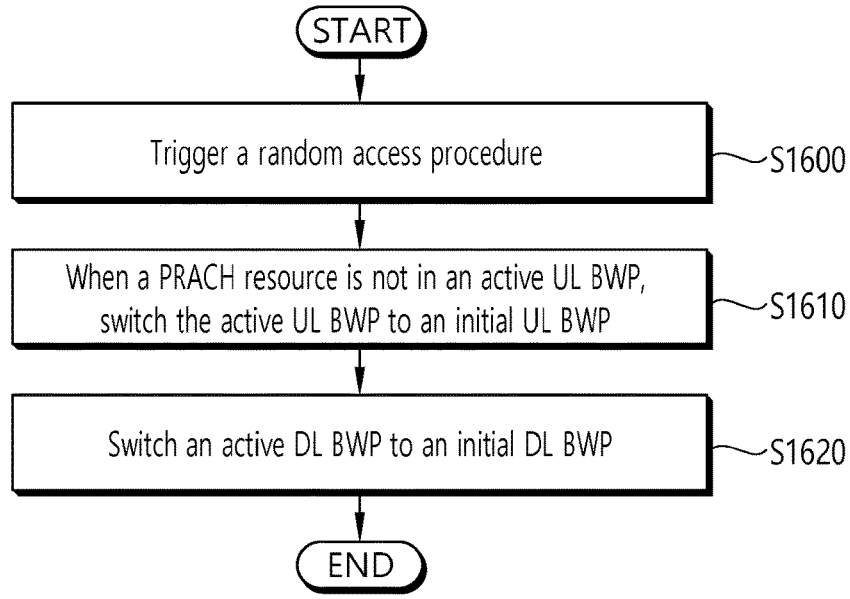
[Fig. 17]
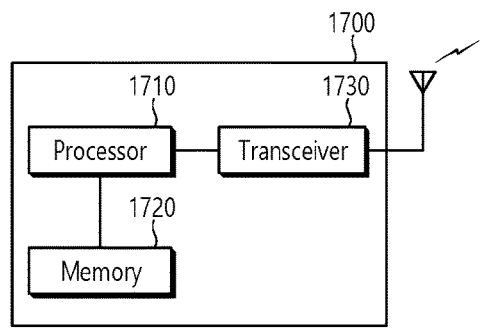
[Fig. 18]
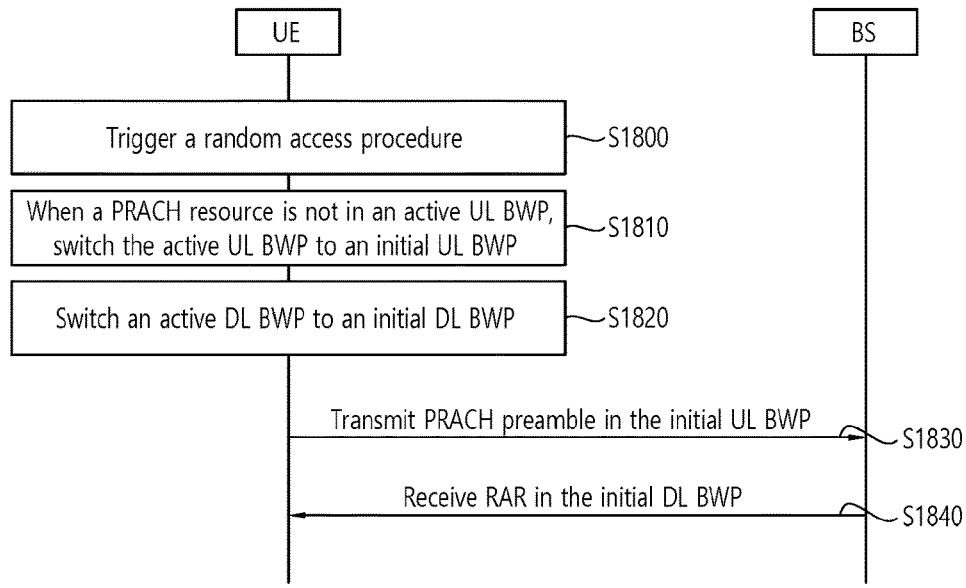

[Fig. 19]
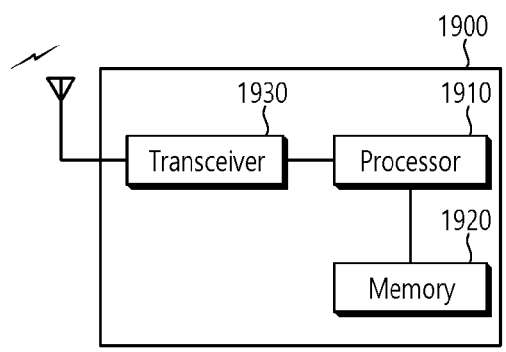

METHOD AND APPARATUS FOR PERFORMING RANDOM ACCESS PROCEDURE IN WIRELESS COMMUNICATION SYSTEM

CROSS-REFERENCE TO RELATED APPLICATIONS

This application is a National Stage application under 35 U.S.C. § 371 of International Application No. PCT/KR2018/012651, filed on Oct. 24, 2018, which claims the benefit of U.S. Provisional Application No. 62/593,990, filed on Dec. 3, 2017, U.S. Provisional Application No. 62/593,131, filed on Nov. 30, 2017, U.S. Provisional Application No. 62/592,324, filed on Nov. 29, 2017, U.S. Provisional Application No. 62/591,685, filed on Nov. 28, 2017, U.S. Provisional Application No. 62/590,340, filed on Nov. 23, 2017, U.S. Provisional Application No. 62/588,884, filed on Nov. 20, 2017, U.S. Provisional Application No. 62/588,274, filed on Nov. 17, 2017, U.S. Provisional Application No. 62/579,085, filed on Oct. 30, 2017, and U.S. Provisional Application No. 62/576,585, filed on Oct. 24, 2017. The disclosures of the prior applications are incorporated by reference in their entirety.

TECHNICAL FIELD

The present invention relates to wireless communications, and more particularly, to a method and apparatus for performing a random access procedure in a new radio access technology (RAT) system.

BACKGROUND ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

NR is a technology that operates on a very wideband compared with LTE. In order to support flexible broadband operation, NR has the following design principles different from LTE in terms of broadband support.

The ability of the network and the user equipment (UE) to support the bandwidth may be different.

The bandwidth capabilities of the downlink and uplink supported by the UE may be different.

The capabilities of the bandwidths supported by each UE may differ, so that UEs supporting different bandwidths may coexist within one network frequency band.

In order to reduce the power consumption of the UE, the UE may be configured with different bandwidth depending on the traffic load state of the UE, etc.

In order to satisfy the above-mentioned design principles, NR newly introduced a concept of bandwidth part (BWP) in addition to carrier aggregation (CA) of existing LTE.

DISCLOSURE OF INVENTION

Technical Problem

Due to the nature of the newly introduced BWP in NR, different issues can arise in different scenarios. The present invention discusses issues to handle BWP operation in NR carrier.

Solution to Problem

In an aspect, a method for performing a random access procedure by a user equipment (UE) in a wireless communication system is provided. The method includes triggering the random access procedure, when a physical random access channel (PRACH) resource is not in an active uplink (UL) bandwidth part (BWP), switching the active UL BWP to an initial UL BWP, and switching an active DL BWP to an initial DL BWP.

In another aspect, a user equipment (UE) in a wireless communication system is provided. The UE includes a memory, a transceiver, and a processor, operably coupled to the memory and the transceiver, that triggers a random access procedure, when a physical random access channel (PRACH) resource is not in an active uplink (UL) bandwidth part (BWP), switches the active UL BWP to an initial UL BWP, and switches an active DL BWP to an initial DL BWP.

Advantageous Effects of Invention

Random access procedure can be performed efficiently considering UL/DL BWP.

BRIEF DESCRIPTION OF DRAWINGS

FIG. 1 shows an example of a wireless communication system to which technical features of the present invention can be applied.

FIG. 2 shows another example of a wireless communication system to which technical features of the present invention can be applied.

FIG. 3 shows an example of a frame structure to which technical features of the present invention can be applied.

FIG. 4 shows another example of a frame structure to which technical features of the present invention can be applied.

FIG. 5 shows an example of a resource grid to which technical features of the present invention can be applied.

FIG. 6 shows an example of a synchronization channel to which technical features of the present invention can be applied.

FIG. 7 shows an example of a frequency allocation scheme to which technical features of the present invention can be applied.

FIG. 8 shows an example of multiple BWPs to which technical features of the present invention can be applied.

FIG. 9 shows an example of a problem of the prior art when configuring UL BWP.

FIG. 10 shows an example of DL-UL pairing according to an embodiment of the present invention.

FIG. 11 shows an example of PUCCH handling according to an embodiment of the present invention.

FIG. 12 shows an example of CSS and/or PRACH configuration from network perspective according to an embodiment of the present invention.

FIG. 13 shows another example of CSS and/or PRACH configuration from network perspective according to an embodiment of the present invention.

FIG. 14 shows an example of PRB indexing in a wideband according to an embodiment of the present invention.

FIG. 15 shows an example of PRB indexing in a wideband according to an embodiment of the present invention.

FIG. 16 shows a method for performing a random access procedure by a UE according to an embodiment of the present invention.

FIG. 17 shows a UE to implement an embodiment of the present invention.

FIG. 18 shows a method for performing a random access procedure by UE and BS according to an embodiment of the present invention.

FIG. 19 shows a BS to implement an embodiment of the present invention.

MODE FOR THE INVENTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (DL). For example, only OFDMA may be used for DL and only SC-FDMA may be used for UL. Alternatively, OFDMA and SC-FDMA may be used for DL and/or UL.

FIG. 1 shows an example of a wireless communication system to which technical features of the present invention can be applied. Specifically, FIG. 1 shows a system architecture based on an evolved-UMTS terrestrial radio access network (E-UTRAN). The aforementioned LTE is a part of an evolved-UTMS (e-UMTS) using the E-UTRAN.

Referring to FIG. 1, the wireless communication system includes one or more user equipment (UE 10), an E-UTRAN and an evolved packet core (EPC). The UE 10 refers to a communication equipment carried by a user. The UE 10 may be fixed or mobile. The UE 10 may be referred to as another terminology, such as a mobile station (MS), a user terminal (UT), a subscriber station (SS), a wireless device, etc.

The E-UTRAN consists of one or more base station (BS) 20. The BS 20 provides the E-UTRA user plane and control plane protocol terminations towards the UE 10. The BS 20 is generally a fixed station that communicates with the UE 10. The BS 20 hosts the functions, such as inter-cell radio resource management (RRM), radio bearer (RB) control, connection mobility control, radio admission control, measurement configuration/provision, dynamic resource allocation (scheduler), etc. The BS may be referred to as another terminology, such as an evolved NodeB (eNB), a base transceiver system (BTS), an access point (AP), etc.

A downlink (DL) denotes communication from the BS 20 to the UE 10. An uplink (UL) denotes communication from the UE 10 to the BS 20. A sidelink (SL) denotes communication between the UEs 10. In the DL, a transmitter may be a part of the BS 20, and a receiver may be a part of the UE 10. In the UL, the transmitter may be a part of the UE 10, and the receiver may be a part of the BS 20. In the SL, the transmitter and receiver may be a part of the UE 10.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 30 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 10 is connected to the BS 20 by means of the Uu interface. The UEs 10 are interconnected with each other by means of the PC5 interface. The BSs 20 are interconnected with each other by means of the X2 interface. The BSs 20 are also connected by means of the S1 interface to the EPC, more specifically to the MME by means of the S1-MME interface and to the S-GW by means of the S1-U interface. The S1 interface supports a many-to-many relation between MMEs/S-GWs and BSs.

FIG. 2 shows another example of a wireless communication system to which technical features of the present invention can be applied. Specifically, FIG. 2 shows a system architecture based on a 5G new radio access technology (NR) system. The entity used in the 5G NR system (hereinafter, simply referred to as "NW") may absorb some or all of the functions of the entities introduced in FIG. 1 (e.g. eNB, MME, S-GW). The entity used in the NR system may be identified by the name "NG" for distinction from the LTE.

Referring to FIG. 2, the wireless communication system includes one or more UE 11, a next-generation RAN (NG-RAN) and a 5th generation core network (5GC). The NG-RAN consists of at least one NG-RAN node. The NG-RAN node is an entity corresponding to the BS 20 shown in FIG. 1. The NG-RAN node consists of at least one gNB 21 and/or at least one ng-eNB 22. The gNB 21 provides NR user plane and control plane protocol terminations towards the UE 11. The ng-eNB 22 provides E-UTRA user plane and control plane protocol terminations towards the UE 11.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs and ng-eNBs are interconnected with each other by means of the Xn interface. The gNBs and ng-eNBs are also connected by means of the NG interfaces to the 5GC, more specifically to the AMF by means of the NG-C interface and to the UPF by means of the NG-U interface.

A structure of a radio frame in NR is described. In LTE/LTE-A, one radio frame consists of 10 subframes, and one subframe consists of 2 slots. A length of one subframe may be 1 ms, and a length of one slot may be 0.5 ms. Time for transmitting one transport block by higher layer to physical layer (generally over one subframe) is defined as a transmission time interval (TTI). A TTI may be the minimum unit of scheduling.

Unlike LTE/LTE-A, NR supports various numerologies, and accordingly, the structure of the radio frame may be varied. NR supports multiple subcarrier spacings in frequency domain. Table 1 shows multiple numerologies supported in NR. Each numerology may be identified by index $\mu$.

TABLE 1

| $\mu$ | Subcarrier spacing (kHz) | Cyclic prefix | Supported for data | Supported for synchronization |
|---|---|---|---|---|
| 0 | 15 | Normal | Yes | Yes |
| 1 | 30 | Normal | Yes | Yes |
| 2 | 60 | Normal, Extended | Yes | No |
| 3 | 120 | Normal | Yes | Yes |
| 4 | 240 | Normal | No | Yes |

Referring to Table 1, a subcarrier spacing may be set to any one of 15, 30, 60, 120, and 240 kHz, which is identified by index $\mu$. However, subcarrier spacings shown in Table 1 are merely exemplary, and specific subcarrier spacings may be changed. Therefore, each subcarrier spacing (e.g. $\mu$=0, 1 . . . 4) may be represented as a first subcarrier spacing, a second subcarrier spacing . . . Nth subcarrier spacing.

Referring to Table 1, transmission of user data (e.g. physical uplink shared channel (PUSCH), physical downlink shared channel (PDSCH)) may not be supported depending on the subcarrier spacing. That is, transmission of user data may not be supported only in at least one specific subcarrier spacing (e.g. 240 kHz).

In addition, referring to Table 1, a synchronization channel (e.g. a primary synchronization signal (PSS), a secondary synchronization signal (SSS), a physical broadcast channel (PBCH)) may not be supported depending on the subcarrier spacing. That is, the synchronization channel may not be supported only in at least one specific subcarrier spacing (e.g. 60 kHz).

In NR, a number of slots and a number of symbols included in one radio frame/subframe may be different according to various numerologies, i.e. various subcarrier spacings. Table 2 shows an example of a number of OFDM symbols per slot, slots per radio frame, and slots per subframe for normal cyclic prefix (CP).

TABLE 2

| $\mu$ | Number of symbols per slot | Number of slots per radio frame | Number of slots per subframe |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Referring to Table 2, when a first numerology corresponding to $\mu$=0 is applied, one radio frame includes 10 subframes, one subframe corresponds to one slot, and one slot consists of 14 symbols. In the present specification, a symbol refers to a signal transmitted during a specific time interval. For example, a symbol may refer to a signal generated by OFDM processing. That is, a symbol in the present specification may refer to an OFDM/OFDMA symbol, or SC-FDMA symbol, etc. A CP may be located between each symbol.

FIG. 3 shows an example of a frame structure to which technical features of the present invention can be applied. In FIG. 3, a subcarrier spacing is 15 kHz, which corresponds to $\mu$=0.

FIG. 4 shows another example of a frame structure to which technical features of the present invention can be applied. In FIG. 4, a subcarrier spacing is 30 kHz, which corresponds to $\mu$=1.

Meanwhile, a frequency division duplex (FDD) and/or a time division duplex (TDD) may be applied to a wireless communication system to which an embodiment of the present invention is applied. When TDD is applied, in LTE/LTE-A, UL subframes and DL subframes are allocated in units of subframes.

In NR, symbols in a slot may be classified as a DL symbol (denoted by D), a flexible symbol (denoted by X), and a UL symbol (denoted by U). In a slot in a DL frame, the UE shall assume that DL transmissions only occur in DL symbols or flexible symbols. In a slot in an UL frame, the UE shall only transmit in UL symbols or flexible symbols.

Table 3 shows an example of a slot format which is identified by a corresponding format index. The contents of the Table 3 may be commonly applied to a specific cell, or may be commonly applied to adjacent cells, or may be applied individually or differently to each UE.

TABLE 3

| For- | Symbol number in a slot | | | | | | | | | | | | | |
|---|---|---|---|---|---|---|---|---|---|---|---|---|---|---|
| mat | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| ... | | | | | | | | | | | | | | |

For convenience of explanation, Table 3 shows only a part of the slot format actually defined in NR. The specific allocation scheme may be changed or added.

The UE may receive a slot format configuration via a higher layer signaling (i.e. radio resource control (RRC) signaling). Or, the UE may receive a slot format configuration via downlink control information (DCI) which is received on PDCCH. Or, the UE may receive a slot format configuration via combination of higher layer signaling and DCI.

FIG. 5 shows an example of a resource grid to which technical features of the present invention can be applied. An example shown in FIG. 5 is a time-frequency resource grid used in NR. An example shown in FIG. 5 may be applied to UL and/or DL. Referring to FIG. 5, multiple slots are included within one subframe on the time domain. Specifically, when expressed according to the value of "μ", "14·2μ" symbols may be expressed in the resource grid. Also, one resource block (RB) may occupy 12 consecutive subcarriers. One RB may be referred to as a physical resource block (PRB), and 12 resource elements (REs) may be included in each PRB. The number of allocatable RBs may be determined based on a minimum value and a maximum value. The number of allocatable RBs may be configured individually according to the numerology ("μ"). The number of allocatable RBs may be configured to the same value for UL and DL, or may be configured to different values for UL and DL.

A cell search scheme in NR is described. The UE may perform cell search in order to acquire time and/or frequency synchronization with a cell and to acquire a cell identifier (ID). Synchronization channels such as PSS, SSS, and PBCH may be used for cell search.

FIG. 6 shows an example of a synchronization channel to which technical features of the present invention can be applied. Referring to FIG. 6, the PSS and SSS may include one symbol and 127 subcarriers. The PBCH may include 3 symbols and 240 subcarriers.

The PSS is used for synchronization signal/PBCH block (SSB) symbol timing acquisition. The PSS indicates 3 hypotheses for cell ID identification. The SSS is used for cell ID identification. The SSS indicates 336 hypotheses. Consequently, 1008 physical layer cell IDs may be configured by the PSS and the SSS.

The SSB block may be repeatedly transmitted according to a predetermined pattern within the 5 ms window. For example, when L SSB blocks are transmitted, all of SSB #1 through SSB #L may contain the same information, but may be transmitted through beams in different directions. That is, quasi co-located (QCL) relationship may not be applied to the SSB blocks within the 5 ms window. The beams used to receive the SSB block may be used in subsequent operations between the UE and the network (e.g. random access operations). The SSB block may be repeated by a specific period. The repetition period may be configured individually according to the numerology.

Referring to FIG. 6, the PBCH has a bandwidth of 20 RBs for the 2nd/4th symbols and 8 RBs for the 3rd symbol. The PBCH includes a demodulation reference signal (DM-RS) for decoding the PBCH. The frequency domain for the DM-RS is determined according to the cell ID. Unlike LTE/LTE-A, since a cell-specific reference signal (CRS) is not defined in NR, a special DM-RS is defined for decoding the PBCH (i.e. PBCH-DMRS). The PBCH-DMRS may contain information indicating an SSB index.

The PBCH performs various functions. For example, the PBCH may perform a function of broadcasting a master information block (MIB). System information (SI) is divided into a minimum SI and other SI. The minimum SI may be divided into MIB and system information block type-1 (SIB1). The minimum SI excluding the MIB may be referred to as a remaining minimum SI (RMSI). That is, the RMSI may refer to the SIB1.

The MIB includes information necessary for decoding SIB1. For example, the MIB may include information on a subcarrier spacing applied to SIB1 (and MSG 2/4 used in the random access procedure, other SI), information on a frequency offset between the SSB block and the subsequently transmitted RB, information on a bandwidth of the PDCCH/SIB, and information for decoding the PDCCH (e.g. information on search-space/control resource set (CORESET)/DM-RS, etc., which will be described later). The MIB may be periodically transmitted, and the same information may be repeatedly transmitted during 80 ms time interval. The SIB1 may be repeatedly transmitted through the PDSCH. The SIB1 includes control information for initial access of the UE and information for decoding another SIB.

PDCCH decoding in NR is described. The search space for the PDCCH corresponds to an area in which the UE performs blind decoding on the PDCCH. In LTE/LTE-A, the search space for the PDCCH is divided into a common search space (CSS) and a UE-specific search space (USS). The size of each search space and/or the size of a control channel element (CCE) included in the PDCCH are determined according to the PDCCH format.

In NR, a resource-element group (REG) and a CCE for the PDCCH are defined. In NR, the concept of CORESET is defined. Specifically, one REG corresponds to 12 REs, i.e. one RB transmitted through one OFDM symbol. Each REG includes a DM-RS. One CCE includes a plurality of REGs (e.g. 6 REGs). The PDCCH may be transmitted through a resource consisting of 1, 2, 4, 8, or 16 CCEs. The number of CCEs may be determined according to the aggregation level. That is, one CCE when the aggregation level is 1, 2 CCEs when the aggregation level is 2, 4 CCEs when the aggregation level is 4, 8 CCEs when the aggregation level is 8, 16 CCEs when the aggregation level is 16, may be included in the PDCCH for a specific UE.

The CORESET may be defined on 1/2/3 OFDM symbols and multiple RBs. In LTE/LTE-A, the number of symbols used for the PDCCH is defined by a physical control format indicator channel (PCFICH). However, the PCFICH is not used in NR. Instead, the number of symbols used for the CORESET may be defined by the RRC message (and/or PBCH/SIB1). Also, in LTE/LTE-A, since the frequency bandwidth of the PDCCH is the same as the entire system bandwidth, so there is no signaling regarding the frequency bandwidth of the PDCCH. In NR, the frequency domain of the CORESET may be defined by the RRC message (and/or PBCH/SIB1) in a unit of RB.

In NR, the search space for the PDCCH is divided into CSS and USS. Since the USS may be indicated by the RRC message, an RRC connection may be required for the UE to decode the USS. The USS may include control information for PDSCH decoding assigned to the UE.

Since the PDCCH needs to be decoded even when the RRC configuration is not completed, CSS should also be defined. For example, CSS may be defined when a PDCCH for decoding a PDSCH that conveys SIB1 is configured or when a PDCCH for receiving MSG 2/4 is configured in a random access procedure. Like LTE/LTE-A, in NR, the PDCCH may be scrambled by a radio network temporary identifier (RNTI) for a specific purpose.

A resource allocation scheme in NR is described. In NR, a specific number (e.g. up to 4) of bandwidth parts (BWPs) may be defined. A BWP (or carrier BWP) is a set of consecutive PRBs, and may be represented by a consecutive subsets of common RBs (CRBs). Each RB in the CRB may be represented by CRB1, CRB2, etc., beginning with CRB0.

FIG. 7 shows an example of a frequency allocation scheme to which technical features of the present invention can be applied. Referring to FIG. 7, multiple BWPs may be defined in the CRB grid. A reference point of the CRB grid (which may be referred to as a common reference point, a starting point, etc.) is referred to as so-called "point A" in NR. The point A is indicated by the RMSI (i.e. SIB1). Specifically, the frequency offset between the frequency band in which the SSB block is transmitted and the point A may be indicated through the RMSI. The point A corresponds to the center frequency of the CRB0. Further, the point A may be a point at which the variable "k" indicating the frequency band of the RE is set to zero in NR. The multiple BWPs shown in FIG. 7 is configured to one cell (e.g. primary cell (PCell)). A plurality of BWPs may be configured for each cell individually or commonly.

Referring to FIG. 7, each BWP may be defined by a size and starting point from CRB0. For example, the first BWP, i.e. BWP #0, may be defined by a starting point through an offset from CRB0, and a size of the BWP #0 may be determined through the size for BWP #0.

A specific number (e.g., up to four) of BWPs may be configured for the UE. At a specific time point, only a specific number (e.g. one) of BWPs may be active per cell. The number of configurable BWPs or the number of activated BWPs may be configured commonly or individually for UL and DL. The UE can receive PDSCH, PDCCH and/or channel state information (CSI) RS only on the active DL BWP. Also, the UE can transmit PUSCH and/or physical uplink control channel (PUCCH) only on the active UL BWP.

FIG. 8 shows an example of multiple BWPs to which technical features of the present invention can be applied. Referring to FIG. 8, 3 BWPs may be configured. The first BWP may span 40 MHz band, and a subcarrier spacing of 15 kHz may be applied. The second BWP may span 10 MHz band, and a subcarrier spacing of 15 kHz may be applied. The third BWP may span 20 MHz band and a subcarrier spacing of 60 kHz may be applied. The UE may configure at least one BWP among the 3 BWPs as an active BWP, and may perform UL and/or DL data communication via the active BWP.

A time resource may be indicated in a manner that indicates a time difference/offset based on a transmission time point of a PDCCH allocating DL or UL resources. For example, the start point of the PDSCH/PUSCH corresponding to the PDCCH and the number of symbols occupied by the PDSCH/PUSCH may be indicated.

Carrier aggregation (CA) is described. Like LTE/LTE-A, CA can be supported in NR. That is, it is possible to aggregate continuous or discontinuous component carriers (CCs) to increase the bandwidth and consequently increase the bit rate. Each CC may correspond to a (serving) cell, and each CC/cell may be divided into a primary serving cell (PSC)/primary CC (PCC) or a secondary serving cell (SSC)/secondary CC (SCC).

Regarding various operations, the following issues may occur.
Issue 1: UE TX direct current (DC)
Issue 2: DL-UL pairing
Issue 3: PUCCH resource
Issue 4: Fallback DCI
Issue 5: Measurement gap configuration
Issue 6: RACH configuration
Issue 7: Default BWP configuration
Issue 8: Bandwidth switching handling
Issue 9: CSI handling Issues related various BWP operations may be summarized in Table 4 below.

TABLE 4

|  | Paired PCell | Unpaired PCell | Secondary cell (SCell) | Unpaired SCell | Paired primary SCell (PSCell) | Unpaired PSCell |
|---|---|---|---|---|---|---|
| Initial UL BWP | Issue 1 | Issue 2 (UL center) | Issue 1 | Issue 2 (UL center) | Issue 1 | Issue 2 |
| Default DL BWP | Issue 3/ Issue 4 | Issue 2 (UL center)/ Issue 3 | | | | |
| Default UL BWP | Issue 7 | | | | | |
| Intra-frequency radio resource management (RRM) | Issue 5 | | | | | |
| Subband CSI | Issue 9 | | | | | |
| RACH procedure after connection | Issue 6 | | | | | |
| BWP switching | Issue 8 | | | | | |

In Table 4, "paired" means a paired spectrum, and the paired spectrum is a band in which the carrier of the DL and the carrier of the UL are paired with each other. In Table 4, "unpaired" means an unpaired spectrum, and the unpaired spectrum is a band in which the carrier of the DL and the carrier of the UL are included in one band.

Hereinafter, a method for performing BWP operations proposed by the present invention is described. According to various embodiments of the present invention to be described below, the present invention aims at solving issue 1 to issue 9 described above. Unless otherwise indicated, each mentioned issue or solution may be applied in different cell (e.g. PCell, SCell or PSCell), and may also be applied to both DL and UL.

1. Issue 1: UE TX DC

A UE may perform various operations, e.g. sidelink operation, transmission to multiple transmission/reception points (TRPs), UL sharing for LTE-NR coexistence, etc. Therefore, even though the network configures UL BWP, UE's transmission radio frequency (RF) may not be restricted to the UL BWP. Furthermore, when a UE is configured with sounding reference signal (SRS) outside of its active UL BWP, as long as that the total bandwidth to transmit SRS and/or data is within UE's RF, it may be generally desirable not to configure a gap for SRS transmission, unless SRS uses different numerology. In this sense, a UE may indicate whether the gap is necessary or not for SRS configuration outside of its active BWP. Or, the network may or may not configure the gap for SRS transmission depending on UE RF capability. However, it may be needed to have a gap for RF switching.

Alternatively, a UE may be indicated/configured with keeping its maximum RF for UL, and resource allocation may be restricted to the configured active BWP. By this way, the UE may not need to change its center (thus, no change in TX DC), and then may transmit SRS outside of active BWP without any gap. Or, the UE may indicate whether the UE can keep its maximum RF or needs a gap for transmission outside of active BWP. If a UE changes its TX DC, the UE needs to inform the network about it. Or, a UE may not switch its TX DC regardless of active BWP switching. Considering this, a UE may indicate it's DC position which may be used regardless of BWP configuration. If different DC position is used per each configured BWP, a UE may indicate a set of DCs per each configured UL BWP. Similar indication may also be considered for unpaired case as well. Alternatively, the lowest PRB's subcarrier 0 or center subcarrier or highest PRB's subcarrier 0 may be used for UL DC for each configured UL BWP. Actual UE's center may be different. Further details will be discussed below.

2. Issue 2: DL-UL Paring

In unpaired spectrum and/or paired spectrum, when configuring UL BWP, some considerations on sidelink needs to be handled. A UE may indicate resources for UL transmission that the UE intends to use based on common PRB indexing. Accordingly, the network can ensure that UL BWP configuration does not exceed UE's UL capability considering the indicated resource.

FIG. 9 shows an example of a problem of the prior art when configuring UL BWP. A UE may access sidelink resource. The UE may report potential use of sidelink resource in lower part. In this case, the network cannot configure UL BWP in the right part where the total bandwidth of UL BWP and sidelink resource exceeds UE's bandwidth capability.

In terms of BWP pairing, only constraint may be that the total bandwidth of DL/UL does not exceed UE's RF capability based on certain center frequency. In order not to change center frequency, which particularly necessary for continuous sidelink operation, in unpaired spectrum, UE's center may be fixed, or may be requested by the UE to have a fixed location. Then, based on the indicated center, DL-UL pairing may not exceed UE's RF capability.

FIG. 10 shows an example of DL-UL pairing according to an embodiment of the present invention. In FIG. 10, the center may be the center of SS/PBCH block. Or, a UE may indicate its center. Or, the network may indicate the center for the UE. A UE may report resources which are not known to the network but used by the UE for some transmissions. This may also be indicated to different cells, or to TRPs of other cell for TRP's use, or to gNB for eNB use, or to eNB for gNB's use.

Particularly, when UL sharing is achieved at the UE in LTE-NR coexistence, it is necessary to keep the same UL frequency. In that sense, the center of LTE carrier may be the center of NR carrier, and UL BWP may be configured within UE's RF capability for UL with keeping the same UL center. If NR uses unpaired spectrum, DL-UL pairing may be done similarly. In summary, a UE's UL center may need to be fixed or higher layer configured, and UL BWP should not be altered freely. In this case, UL BWP may need to be constrained within UE's RF capability based on a center frequency of UL.

In unpaired spectrum, if DL BWP changes according to timer for default BWP, it may also be necessary to define what the paired UL BWP is. In this sense, default UL BWP may also be configured when default DL BWP is configured.

3. Issue 3: PUCCH Resource

When DL and UL BWP switching occurs independently, handling of PUCCH resource needs to be clarified. In each UL BWP, a set of (or multiple sets of) PUCCH resources may be configured, and the same and/or different PUCCH resource may be configured in each BWP. Each DL scheduling assignment may include PUCCH resource. Only a subset of scheduling DCIs corresponding to the same PUCCH resource may include PUCCH resource. Or, every scheduling DCI may include PUCCH resource. In terms of UL BWP switching, to avoid ambiguity, the following options may be considered.

(1) Option 1: UL BWP switching command may not be considered as valid if the switching DCI is transmitted between first DL scheduling DCI and the HARQ-ACK timing.

(2) Option 2: UL BWP switching command may not be considered as valid if corresponding PUSCH occurs before HARQ-ACK transmission for the previous PDSCH transmissions.

FIG. 11 shows an example of PUCCH handling according to an embodiment of the present invention. FIG. 11-(a) shows Option 1 described above. UL BWP switching command is not considered as valid, because the switching DCI is transmitted between first DL scheduling DCI and the HARQ-ACK timing. FIG. 11-(b) shows Option 2 described above. UL BWP switching command is not considered as valid, because corresponding PUSCH occurs before HARQ-ACK transmission for the previous PDSCH transmissions. A UE may drop PUSCH if it is scheduled by invalid BWP switching DCI.

Alternatively, to efficiently handle or remove the constraint, PUCCH resource for each DL BWP may be indicated/configured per each DL BWP. At least for PCell, paired DL-UL BWP may be considered for this purpose. Alternatively, at least for PCell or PUCCH cell, UL BWP may be fixed or only changed semi-static manner (i.e. dynamic UL BWP switching is disabled). Nonetheless, if UL BWP switching is applied, mechanism to ensure no change of PUCCH frequency resource while HARQ-ACKs are aggregated needs to be supported. One approach is to configure common PUCCH resources across multiple UL BWPs. Accordingly, UL BWP may be dynamically changed without concerning on PUCCH resources.

However, it is difficult to configure common PUCCH resources across multiple UL BWPs when different numerologies are supported by multiple UL BWPs. Therefore, DL and UL BWP switching via DCI may be independently configured to be enabled/disabled. UL BWP switching via DCI may be disabled for PUCCH cell by default. If UL BWP switching via DCI is supported, UL BWP switching may not occur before completing HARQ-ACK transmission for the corresponding (earlier) PDSCH(s). If different UL BWPs are used between PUCCH and PUSCH (e.g. adjacent slots), one of the followings may be considered for switching latency.

Before PUSCH which is indicated to switch BWP by
    explicit signaling. In other words, delay may always be
    put on the channel where explicit BWP switching
    command is applied.

Between PUCCH and PUSCH, and lower priority channel may take retuning latency. If PUCCH has CSI and PUSCH has uplink control information (UCI) piggyback, retuning latency may be applied on PUCCH.

UL switching command may be considered as invalid if two scheduled PUCCH and PUSCH collide. However, considering the relationship between semi-static PUCCH and PUSCH or semi-static PUSCH and PUCCH, different handling may be necessary. For example, semi-static PUCCH or PUSCH may be ignored or dropped, if explicit switching command is received and retuning gap collides with semi-static PUCCH or PUSCH. In other words, BWP switching command triggered by explicit command may have higher priority than semi-statically configured or semi-persistently configured PUSCH or PUCCH. In terms of handling BWP switching command, actual BWP switching may occur at the point where scheduled data is transmitted or received. Until then, the UE may process data in the previously active BWP. If conflicting BWP switching commands are indicated both by explicit signaling, it may be considered as error case. Otherwise, the followings may be considered.

Dynamic signaling such as scheduling DCI or activation message may have higher priority that semi-static configured resources. If dynamic message changes BWP which conflicts with semi-static configuration, dynamic signaling may have higher priority.

If dynamic signaling and timer collide, dynamic signaling may have higher priority. For example, in unpaired spectrum, timer may change DL-UL BWP pair. If dynamic signaling changes DL-UL BWP pair, the timer may be cancelled.

When measurement configuration and dynamic signaling indicates BWP switching, measurement gap may have higher priority. A UE may ignore BWP switching commands. If BWP switching command(s) has received before measurement gap and actual BWP switching occurs within measurement gap, the UE may postpone applying BWP switching or skip BWP switching. In other words, if actual scheduled data occurs within the measurement gap, even if the UE has received BWP the switching commands successfully, the UE may ignore the BWP switching command.

Default timer may expire right before measurement gap. In that case, a UE may be expected to switch to default BWP after the measurement gap.

During the measurement gap, a UE may not be expected to increase the timer for default BWP timer.

When a UE does not monitor control channel for some reason (e.g. reserved time), a UE may not increase timer. In terms of increasing timer for default BWP, the timer may be increased only on the semi-statically configured DL (and flexible resource) regardless of actual monitoring. For example, due to slot format indicator (SFI), if a UE skips monitoring of control channels in a set of slots/resources, the UE may increase the timer. As flexible resources may be changed to UL and the UE skips monitoring, for the reliability, only semi-static DL resources may be accounted. Alternatively, the timer may be increased whenever a UE monitors control channel. Otherwise, the timer is not increased. This may increase the ambiguity between the network and UE, and short-term timer such as default timer may be needed. Alternatively, the timer may be increased in the number of slot or K slots regardless of resource type. Similarly, when other timer is increased based on control channel monitoring occasion (such as DRX timer), the above different approaches may be considered.

4. Issue 4: Fallback DCI

When a UE goes back to default BWP, it may be desirable to have CORESET which has the associated search space with fallback DCI. In fallback DCI, contiguous resource allocation (with or without distributed mapping) may be used. When a UE moves from default BWP to another wider BWP, thus, resource allocation field may need to be adjusted even with resource allocation type 2. This may be addressed by configuring the size of resource allocation (RA) field for fallback DCI. But, it may seem not good for fallback DCI.

Alternatively, switching DCI may be scheduled only in USS, and fallback DCI may have different RA field size in CSS and USS if necessary. For example, in CSS, resource allocation may always be based on default BWP or initial BWP or first active BWP. In USS, size of RA field may be configured. In other words, size of fallback DCI may be different depending on which search space set is used. Another approach is to take partial entries from a new BWP's resource allocation for resource allocation type 2, which may be indicated by a DCI over default DL BWP. The same mechanism may be applied to UL as well.

5. Issue 5: Measurement Gap Configuration

Depending on UE's active BWP configuration, it may be necessary to configure measurement gap for both intra-frequency measurement and inter-frequency measurement. The measurement gap configuration may be periodic. Whether a UE needs measurement gap or not may be changed dynamically depending on active BWP change and intra-band carrier aggregation. For example, if intra-band CA is not configured/activated, the UE may use extra RF for the measurement. If intra-band CA is not configured/activated, gap may be necessary. Because it is not efficient for the UE to have a measurement gap when it's not necessary, signaling of measurement gap necessity may be considered as follows.

(1) Whether a measurement gap is necessary or not may be indicated for each configured measurement object per each configured BWP and/or per each configured carrier combination. For example, it is assumed that a UE is configured with two carriers (CC1 and CC2), and there are four BWPs in each carrier, and the UE is configured with K number of measurement objects for different frequencies including intra- and inter-frequency. In this case, a UE may report K*4*3 (CC1 only, CC2 only, or CC1+CC2) cases whether the measurement gap is needed in each combination or not. Assuming PCell is not changed, only two combination (i.e. PCell only, CC1+CC2) may also be considered for carrier combinations. The network can know whether the measurement gap is needed or not based on the indication.

The drawback of this approach is signaling overhead. A UE needs to indicate every configuration/reconfiguration/change of carriers. Therefore, some optimization to reduce signaling overhead may be considered. For example, signaling may be done only per CC. Depending on the active BWP, required measurement gap may be different. In this sense, separate measurement gap may be configured per configured BWP.

The measurement gap configuration on the active BWP may be triggered for measurement. If BWP switching is triggered and the measurement gap configuration of the currently active BWP is triggered, two approaches may be considered. For the first approach, BWP switching command may be invalidated, and the measurement gap configuration may be applied. For the second approach, higher priority may be put on BWP switching, and then new measurement gaps on the new BWP may be activated.

(2) The worst case for determining measurement gap may be assumed. In other words, if any configured BWP requires measurement gap, the measurement gap may be indicated as needed. Moreover, in terms of measurement gap duration, maximum duration among durations needed for each configured BWP may be reported.

6. Issue 6: RACH Configuration (i.e. RACH Procedure after RRC Connection)

After a UE performs RACH procedure via initial access, a UE may be configured/activated with a first active DL/UL BWP. The first active DL/UL BWP may be changed/reconfigured to be different from the initial DL/UL BWP where the UE has initially performed RACH procedure. In case of handover or PSCell configuration, the initial DL/UL BWP may be a DL/UL BWP which is automatically activated upon handover or activation or configuration of the carrier/cell. When UE is configured and/or active BWP is outside of initial BWP, RACH procedure needs to be clarified.

(1) PRACH resource configuration: A UE may be configured to have separate RACH resources in its configured/active UL BWP (at least for UL BWP outside of initial UL BWP). If there is no RACH resource configuration in its configured/active UL BWP, a UE may go back to initial UL BWP for RACH transmission. Or, a UE may follow PRACH configuration in RMSI. In selecting a PRACH resource, a UE may indicate the resource for active DL BWP where a UE can expect to receive random access response (RAR). In other words, the UE may select PRACH resource which is associated with the RAR. Alternatively, each PRACH resource may be associated with RAR resource or BWP for RAR reception.

In detail, a media access control (MAC) entity of the UE operates as follows. Upon initiation of the random access procedure on a serving cell, the MAC entity shall for this serving cell:

1> if PRACH occasions are not configured for the active UL BWP:
2> switch the active UL BWP to BWP indicated by initialUplinkBWP (i.e. initial UL BWP);
2> if the Serving Cell is a special cell (SpCell):
3> switch the active DL BWP to BWP indicated by initialDownlinkBWP. (i.e. initial DL BWP).
1> else:
2> if the serving cell is a SpCell:
3> if the active DL BWP does not have the same bwp-Id as the active UL BWP:
4> switch the active DL BWP to the DL BWP with the same bwp-Id as the active UL BWP.

The drawback of going back to initial DL/UL BWP is that a UE may be interrupted with DL/UL scheduling, because it may not expect to receive scheduling DCI due to misalignment between the network and the UE. In this sense, even if the RACH resource configuration is not given, it may be desirable that the UE does not change its active DL BWP. To receive RAR successfully in this case, the following two options may be considered.

Option 1: The network may transmit RAR over multiple RAR CORESETs in the network.
Option 2: The UE may select PRACH resource where each PRACH resource is associated with different RAR CORESET. In terms of association, explicit association may be considered. That is, RAR CORESET index may be indicated in each PRACH resource or configuration. Or, there may be a rule to determine RAR CORESET. For example, the first PRB index of RAR CORESET based on common PRB indexing may be used in determining PRACH resource.

(2) If RACH procedure is initiated, and DL/UL BWP has been triggered to be changed by either DCI or timer, a UE may perform at least one of the followings.

The UE may abort current RACH procedure (if DL/UL BWP change is triggered by the UE), then perform the necessary trigger or switching of BWP. In the new BWP, the UE may restart RACH procedure.

The UE may ignore BWP switching commands, and send non-acknowledgement (NACK) to the network for BWP changing commands. Or, the UE may delay going back to default BWP if timer expires until RACH procedure is completed.

The UE may switch BWP as long as old DL BWP and new DL BWP share RAR CORESETs, or old DL BWP and new UL BWP share PRACH and/or MSG3 bandwidth. Otherwise, the UE may perform the above mentioned operation.

In detail, a MAC entity of the UE operates as follows. If the MAC entity receives a PDCCH for BWP switching of a serving cell, the MAC entity shall:

1> if there is no ongoing random access procedure associated with this serving cell; or
1> if the ongoing random access procedure associated with this serving cell is successfully completed upon reception of this PDCCH addressed to cell radio network temporary identifier (C-RNTI):
2> perform BWP switching to a BWP indicated by the PDCCH.

If the MAC entity receives a PDCCH for BWP switching for a serving cell while a random access procedure associated with that serving cell is ongoing in the MAC entity, it is up to UE implementation whether to switch BWP or ignore the PDCCH for BWP switching, except for the PDCCH reception for BWP switching addressed to the C-RNTI for successful random access procedure completion in which case the UE shall perform BWP switching to a BWP indicated by the PDCCH. Upon reception of the PDCCH for BWP switching other than successful contention resolution, if the MAC entity decides to perform BWP switching, the MAC entity shall stop the ongoing random access procedure and initiate a random access procedure after performing the BWP switching. If the MAC decides to ignore the PDCCH for BWP switching, the MAC entity shall continue with the ongoing random access procedure on the serving cell.

(3) For MSG3, RACH configuration may have the associated MSG3 information as well such that a UE is not required to switch UL BWP.

FIG. 12 shows an example of CSS and/or PRACH configuration from network perspective according to an embodiment of the present invention. FIG. 12-(a) shows CSS and/or PRACH configuration during initial access procedure. For initial access, to identify PRACH resource and CSS, the followings may be considered.

For a given CSS (which is defined by RMSI CORESET and/or RMSI CSS), a set of PRACH resources may be defined. For example, CSS1 may be associated with PRACH 1, and CSS2 may be associated with PRACH 2. A UE accessed CSS1 for RMSI may use only PRACH 1 for RACH procedure, and a UE accessed CSS2 for RMSI may use only PRACH 2 for RACH procedure. Correspondingly, RAR and MSG4 may be transmitted in the same CSS, and MSG3 may be transmitted around the selected PRACH resource.

For a PRACH resource, a CSS may be configured. For example, PRACH 1 may configure CSS2, and PRACH 2 may configure CSS1. Depending on the selected PRACH resource, a UE may switch its CSS accordingly. In this case, the CORESET for RMSI or CSS for RMSI may be different from CORESET and/or CSS for RAR/MSG4. To support this, RAR information needs to be configured with PRACH resources. However, this approach leads change of DL BWP as well. Thus, some ambiguity between the network and the UE may occur when a UE initiates RACH procedure. Thus, when this approach is used, a UE may not expect to receive any data or control channel during RACH procedure.

FIG. 12-(b) shows CSS and/or PRACH configuration after initial access procedure is completed (i.e. after connection). In FIG. 12-(b), it is assumed that UE1's UL BWP and UE2's UL BWP are configured such that UE1's UL BWP includes both PRACH 1 and PRACH 2, UE2's UL BWP includes only PRACH 2, and UE3's UL BWP does not include any PRACH resource. Similarly, it is assumed that UE1's DL BWP includes more than one CSS, UE2's DL BWP includes only one CSS, and UE3's DL BWP does not include any CSS defined during initial access procedure.

For UE1, CSS used in initial access, unless it is reconfigured, may be used for RACH procedure. The PRACH resource used in initial access may also be used. If the network wants to allow the UE to access other PRACH resources, the network may configure other PRACH resources and the associated CSS as well. In other words, multiple CSS may be configured to UE1 and each CSS may have one or more of associated PRACH resources. Depending on the selected PRACH resource, the UE may monitor the associated CSS for RAR/MSG4. For MSG3, PRACH configuration may be followed. Or, associated UL BWP configuration instead of its current UL BWP may be followed, as the network may not know which UE has transmitted PRACH.

For UE2, CSS 1 and PRACH 2 are within its DL and UL BWP, but CSS 1 may not be associated with PRACH 2 from the network perspective. If UE2 has used PRACH 1 and CSS 1 in initial access, unless the network reconfigures PRACH resources in its UL BWP which may be associated with CSS 1, the UE cannot use PRACH 2 even though it's within its UL BWP. In other words, PRACH resource which is associated with CSS which is included in its active DL BWP may be used without additional configuration. However, other PRACH resource cannot be used. To support such a UE, the network may configure additional PRACH resource in its current active UL BWP or per UL BWP which may be associated with CSS in its DL active BWP. As one UE may be configured with multiple BWPs (e.g. UE2 is configured with BWP for UE2 and the same as BWP for UE3), this configuration may be done per each DL BWP. In other words, PRACH resource, MSG3 resource may be configured for each DL BWP. If the UE may have multiple UL BWPs as well, multiple PRACH resources may also be configured for one DL BWP.

For UE3, unless PRACH configuration and CSS configuration is given, RACH procedure may be not performed in the configured DL/UL BWP.

FIG. 13 shows another example of CSS and/or PRACH configuration from network perspective according to an embodiment of the present invention. Referring to FIG. 13, if DL and UL BWPs are changed during RACH procedure, it may be very challenging to align between the network and UE, unless the network transmits RAR over multiple CSSs. Yet, changing UL BWP seems not working between PRACH and UL BWP. In this sense, during RACH procedure, it may not be desirable to switch DL/UL BWP, unless old UL BWP and new UL BWP share CORESET for RAR/MSG4 and PRACH and MSG3, PUCCH for MSG4.

In summary, the followings may be proposed according to the present invention.

RACH procedure after RRC connection may be aborted if BWP switching occurs. Or, RACH procedure may be continued and failure may occur in RAR reception and/or MSG3 transmission and/or MSG4 reception.

RACH procedure after RRC connection may be aborted if BWP switching changes CORESET/CSS for RAR/MSG4 and/or PRACH, MSG3 or PUCCH resource configuration. Default acknowledgement/non-acknowledgement (ACK/NACK) resource configuration for RACH procedure may need to be configured per each BWP. Alternatively, BWP switching occurs, and necessary recovery may be handled by retransmission of RACH procedure.

BWP command may be aborted/ignored during RACH procedure. If BWP switching command may be aborted/ignored, a UE may not send NACK or ACK as the BWP switching command has been ignored. A UE may perform discontinuous transmission (DTX) on the corresponding data. For PUSCH case, PUSCH transmission may be dropped.

Alternatively, RACH procedure may be performed at the switched BWP, which may lead failure of RACH procedure. When retransmission occurs, retransmission counter and/or power ramping may be performed or it may be indicated to the higher layer about BWP switching such that retransmission timer increase and power ramping procedure would not be occurred. In this case, for BWP switching commands/data, necessary HARQ-ACK feedbacks may be expected.

RACH procedure may occur in predefined or configured DL/UL BWP which may be different from currently active DL/UL BWP. If it is different from currently active DL/UL BWP, a UE may not be required to receive/transmit data during the RACH procedure.

It may be ensured that each configured DL/UL BWP includes CSS for RAR/MSG4 and PRACH/MSG3 information. Also, between DL BWP and UL BWP for RACH procedure, of DL BWP and UL BWP may be paired. The paring relationship between DL BWP and UL BWP may be m-n relationship instead of 1-1 relationship. A UE may adopt BWP switching as long as the changes occurs between DL/UL pairs for the same RACH procedure. In other words, a set of DL/UL BWPs may be configured for a RACH resource or per CSS, or between a PRACH and CSS. This procedure is more straightforward in unpaired spectrum. For DL-UL pair, necessary RACH/MSG3 and CSS configuration may be considered. The similar approach may also be considered even for paired spectrum. Switching of DL BWP may also change UL BWP accordingly by paring DL BWP and UL BWP. Alternatively, switching of UL BWP may also change DL BWP. For example, change of UL BWP to initial UL BWP due to RACH procedure may also lead to change of DL BWP to initial DL BWP. Similar handling may be applied to default timer case. That is, DL BWP or paired DL/UL BWP changes.

RACH procedure may occur only in initial or default BWP. The default BWP may also be configured with CSS for RAR/MSG4, and define PRACH resources correspondingly. If PRACH resource is different or not included in one or more UL BWPs, a UL BWP may also be configured which will be switched when DL BWP switches to default DL BWP.

As the network does not know whether the UE performs RACH procedure or not, BWP switching may be triggered at least for DL BWP. Thus, after transmitting PRACH, a UE may switch its DL BWP where a UE expects to receive RAR. As the network does not know which UEs have sent PRACH, unless there is linkage between PRACH resources and RAR CORESET, the network may need to send RAR to all RAR CORESETs in the network. In unpaired spectrum, it may be managed better as DL/UL BWP is paired, and RAR CORESET may be associated with PRACH in the same frequency region and/or between paired DL/UL BWP. In paired spectrum, the following options may be considered.

(1) A UE may switch to initial UL BWP for contention-based RACH procedure, and initial DL BWP for RAR reception. A UE may be configured with PRACH resources and RAR CORESET, which may be used after RRC connection and may be different from initial BWPs. Yet, this option may allow the UE to switch to different BWP upon RACH procedure (for contention-based RACH procedure). A UE may come back to the current active BWP, while it may not be required to monitor RAR/MSG4 or to transmit MSG3 or feedback on MSG4.

(2) A UE may stay in currently active DL/UL BWP, and the network may ensure transmission of RAR at the currently active DL BWP. It may be further considered to determine random access RNTI (RA-RNTI) based on the frequency location of PRACH as well as time information to differentiate different frequency PRACH resources. Alternatively, a UE may stay on the currently active UL BWP if PRACH resource is configured. Then, the UE may switch DL BWP which is paired with the currently active UL BWP for RAR reception/RACH procedure.

In either way, a UE may handle BWP switching in the middle. Meanwhile, in unpaired spectrum, when DL/UL BWP pair is switched after PRACH transmission, a UE may not receive RAR because DL BWP has been changed. This may trigger PRACH retransmission. As the UE has not received RAR due to BWP switching, in this case, it may be considered not to increase retransmission counter nor power ramping.

Depending on the option, the necessity of RAR CORESET configuration per BWP may be determined. At least in unpaired spectrum, separate PRACH and RAR CORESET may be configured per each DL-UL BWP pair. In this way, a UE can perform RACH procedure in the active BWP without interruption of current activity. This is particularly important when RACH procedure is used for beam recovery, scheduling request (SR) request, etc. In paired spectrum, similar approach may be considered with some further consideration on linkage between PRACH and RAR. One example of DL/UL BWP linkage in paired spectrum is to link DL and UL BWP with the same BWP index. If there is no configured RAR CORESET or PRACH resource, a UE may go back to initial DL/UL BWP.

In summary, overall proposals may be as follows.

At least for unpaired spectrum case, RAR CORESET and PRACH resource may configured for each DL-UL BWP pair.

When there is no PRACH or RAR CORESET is available in currently active UL or DL BWP, RACH procedure may be performed at initial UL and/or DL BWP.

At least in unpaired spectrum case, if failure of RAR response or MSG3 transmission or response of MSG4 occurs due to BWP switching in the middle of RACH procedure, retransmission counter may not be increased and/or power ramping may not be performed.

PRACH resource may be configured with an ID which represents frequency domain information and may be used for RNTI computation. In addition to time-domain information, frequency domain ID may be used for computing RNTI.

Alternatively, PRACH resources may be configured for each configured DL BWP along with RAR related CSS, related CORESET/search space configurations. When the UE needs to perform RACH procedure, at first, a UE may select the PRACH resource associated with the current CSS or configured in active DL BWP. If the PRACH resource is outside of its currently active UL BWP, the UE may retune to PRACH resource temporarily just to transmit PRACH, and come back to current active UL BWP for further transmission. A UE may expect that the network schedules MSG3 within the associated UL BWP with the configured PRACH resource. For this, the following parameters may be necessary or the following approaches may be considered.

(1) Option 1: For each DL BWP, there may be association to UL BWP for RACH procedure. If the associated UL BWP is different from currently active UL BWP, the UE may retune to the UL BWP temporarily for RACH/MSG3/HARQ-ACK transmission. After each transmission, the UE may come back to its current active UL BWP. DL BWP may not be changed. RAR may be scheduled within UL BWP and the resource allocation size may be same as UL BWP's bandwidth. Or, bandwidth used for MSG3 may also be configured for each UL BWP. In other words, if this approach is used, RACH configurations, bandwidth/the lowest PRB for MSG3 transmission, HARQ-ACK related parameters for MSG 4 feedbacks, etc., may be configured per each UL BWP. In addition, related parameters for MSG3 transmission, e.g. hopping offset, etc., may also be configured per each UL BWP.

(2) Option 2: For each DL BWP, there may be RACH configurations associated with one of UL BWP. In addition to PRACH, initial UL BWP around PRACH may also be configured for each DL BWP. In other word, the lowest PRB/bandwidth of UL BWP used for MSG3/HARQ-ACK transmission may be configured. This configurations may be independent from other UL BWP configurations.

As it is generally not desirable to have many UL BWP configurations, it is considered that Option 1 may be used.

In summary, for PRACH procedure (and possibly for other procedure, e.g. beam failure recovery procedure), particularly for contention-based RACH procedure, each DL BWP may be configured with UL BWP index for RACH procedure. The same mechanism may also be used for contention-free RACH procedure). When RACH procedure is triggered, the UE may switch to the associated UL BWP, if it is different from current active UL, and the associated UL BWP may become effective. Or, when PRACH procedure is triggered, the UE may switch temporarily to the associated UL BWP, if it is different form current active UL, only to transmit RACH/MSG3/HARQ-ACK. After transmitting MSG4, the necessary procedure may occur in the currently active UL BWP. After RACH procedure is completed, the UE may come back to currently active UL BWP.

7. Issue 7: Default BWP Configuration

When initial BWP is considered, to minimize overhead of RMSI, it may be considered to have a default value when the configuration for either DL or UL BWP is not given. For DL BWP, one configuration from potential configurations of RMSI CORESET bandwidth/frequency may be considered as the default configuration.

For UL BWP, at least one of the followings may be considered.

(1) Same BWP to DL BWP: In unpaired spectrum, the default UL BWP configuration may have the same bandwidth and/or frequency location as the default DL BWP configuration. If DL and UL use different frequency, the same bandwidth and/or same number of PRBs may be used. The center may or may not be same depending on location of PRB 0. If DL and UL use different numerology, it needs to be indicated or the center may be same between DL and UL (i.e. PRB grid is nested at the center of DL BWP and UL BWP). In paired spectrum, a fixed DL-UL separation gap or duplex gap may be used between DL and UL, and similar mechanism as the unpaired spectrum case may be applied.

(2) Around RACH, as there may be multiple RACH configurations which are multiplexed by frequency division multiplexing (FDM), if this is used, some clarification (e.g. take the lowest PRACH) may be necessary.

(3) When UE's minimum capability is different for DL and UL, at least one of the followings may be considered.

Lowest PRB of DL BWP and UL BWP are aligned. In paired spectrum, the lowest PRB of DL BWP and UL BWP may be aligned based on duplex gap between DL and UL. In unpaired spectrum, the lowest PRB of DL BWP and UL BWP may have same frequency.

Center of DL BWP and center of UL BWP may be aligned including nested structure between different numerologies.

Highest PRB of DL BWP and UL BWP may be aligned. In each approach, additional offset for UL BWP may be used.

(4) BW of DL BWP May be at Least One of the Followings.

Min {minimum system carrier's bandwidth in that band or frequency region, UE minimum bandwidth in that band or frequency region}

Fixed per frequency region or band

Advertised in PBCH (5) BW of UL BWP May be at Least One of the Followings.

Min {minimum system carrier's bandwidth in that band or frequency region, UE minimum bandwidth in that band or frequency region} (for UL)

Mini {DL BWP bandwidth, minimum system carrier's bandwidth in that band or frequency region, UE minimum bandwidth in that band or frequency region} (at least for unpaired spectrum/may be applied to paired spectrum as well)

Minimum system carrier's bandwidth may be defined as absolute bandwidth instead of number of PRBs.

Even if flexible duplex gap is supported by a UE, a default duplex gap may be used per band or frequency range when defining default configuration without explicit configurations.

8. Issue 8: Bandwidth Switching Handling

In BWP switching, the followings cases may occur.

(1) Initial DL BWP→First Active DL BWP

Initial DL BWP may be used until a UE is configured with other BWPs. At RRC configuration or by explicit indication, active DL BWP may be configured with RRC configuration when BWP(s) are configured. For example, among configured BWP(s), one BWP may be indicated as active, and the indicated BWP may be activated upon receiving RRC configuration. Or, other BWP may be activated only by explicit switching command. Timer to go back to default BWP may be activated only when timer is configured. For timer, initial DL BWP may be configured as default DL BWP or separate default BWP may be separately configured. In initial DL BWP, there may be a separate resource configuration for UL BWP, e.g. PUCCH resource, etc. Upon RRC configuration, a UE may not be configured with first active UL BWP to avoid HARQ-ACK confusion at the network side. In unpaired spectrum, this may not be addressed, and the network may just need to monitor both HARQ-ACK resources (initial UL BWP, first active BWP). This is true regardless of switching mechanism.

Alternatively, the HARQ-ACK resource for fallback DCI may be fixed and fallback DCI may indicate BWP switching. HARQ-ACK resource for fallback DCI may be included in any BWP switching/configuration. In other words, HARQ-ACK resource can be differently configured depending on type of set of search space where DCI has been transmitted or DCI format used in scheduling for C-RNTI.

In case of semi-persistent scheduling (SPS), default timing and default HARQ-ACK resources may be defined which may be overwritten by dynamic HARQ-ACK resource if HARQ-ACK transmission occurs in the same time resource. The same time resource may be the same slot if slot-based scheduling is used. The same time resource may be the same starting slot or may have partial or full overlap of time resource if non-slot-based scheduling is used.

If different HARQ-ACK resources are configured, and a UE have collision between two different HARQ-ACK resources, the UE may follow non-fallback HARQ-ACK resource or dynamically indicated HARQ-ACK resource.

In unpaired spectrum, dynamic HARQ-ACK resource in DL BWP switching may refer paired UL BWP's HARQ-ACK resources instead of current UL BWP's HARQ-ACK resources.

(2) First Active DL BWP→Other Active DL BWP

When RRC reconfiguration is used for active BWP switching, mechanism mentioned in "(1) Initial DL BWP-→First active DL BWP" may be applied.

When DCI switching is used, to avoid change of HARQ-ACK resource at least in unpaired spectrum and/or when DL BWP and UL BWP are paired, dedicated or separate HARQ-ACK resource set may be configured which is used for BWP switching duration. For paired DL/UL BWP, the same resource in the current UL BWP may be used for HARQ-ACK transmission.

(3) Active DL BWP→Default DL BWP

When timer expires and UE goes back to default DL BWP, unless the UE tells the network when the UE transmits PUSCH or HARQ-ACK, the network may not know that UE goes back to default DL BWP. Particularly, when the UE has any UL grant to receive, the network may need to transmit both to previous active DL BWP and default DL BWP around when timer expires. Alternatively, when the UE has any UL grant to receive, timer may not expire. In other words, if there is any active scheduling either for DL or UL, the UE may reset the timer such that timer does not expire.

Alternatively, PUSCH or PUCCH may be transmitted with indication that the UE goes back to the default DL BWP. The separate indication may also be sent when the UE goes back to the default DL BWP. The indication may use different scrambling and/or different HARQ-ACK resource to indicate that the DL is default DL BWP. When the UE has not received UL grant for retransmission for grant-free UL transmission or grant-based UL transmission, the UE ma y transmit the indication that the UE has changed its DL BWP.

Particularly for grant-free transmission, the network may not know the state of the UE in terms of monitoring DL BWP. In that sense, between two DL BWPs (between active and default BWP), the UE may indicate which one to use for feedback in transmission.

To achieve better reliability where the UE should be ensured with correct control channel reception for HARQ-ACK feedback (e.g. UL grant, HARQ-ACK channels), different timer behavior for ultra-reliable and low latency communications (URLLC) UEs may be considered. First, a UE may be configured with default BWP to be included in all BWP. Or, the UE may go back to default timer only when the UE does not have any DL or UL transmission. When the UE has any data to transmit while there is no DL (and thus, default timer has already expired), the UE may go back to the previously active DL BWP. In other words, a UE may go back to the default DL BWP as long as there is no DL/UL data. Once either one is activated, the UE may go back to the previously active BWP. This implies that scheduling from default DL BWP does not include any BWP or always address the previously active DL BWP.

(4) Default DL BWP→Other Active DL BWP

This may be done by explicit indication/switching commands, and similar handling mentioned above may be applied.

(5) Active DL BWP→Initial DL BWP

For example, if PRACH configuration is not given, or a UE experiences RLM, a UE can go back to initial DL BWP for beam recovery. When radio link monitoring (RLM) occurs or beam recovery is not effectively handled by CSI-RS, the network may indicate the UE to go back to initial BWP. If the UE has not received any beam recovery from the network for a certain threshold, the UE may go back to the initial BWP and then initiate RACH procedure before the UE initiates RLM. Even in initial DL BWP, if there is no SS/PBCH block above the threshold, the UE may immediately trigger radio link failure (RLF).

(6) Initial DL BWP→Other Active DL BWP

After the UE is configured with a set of BWPs, the UE may be switched to different BWP by BWP switching commands/timer.

(7) Initial UL BWP→First Active UL BWP

In unpaired spectrum, if changing DL BWP also leads to change of UL BWP, the BWP switching on both may occur simultaneously.

(8) First Active UL BWP→Other Active UL BWP

In UL BWP switching, two DL BWPs may be paired with the same UL BWP. For example, DL BWP 1 and DL BWP 2 may be paired with UL BWP 3. When command to change the DL BWP to DL BWP 2 from DL BWP 3 (which is paired with UL BWP 1), then the network may transmit UL grant to change the UL BWP to UL BWP 2 (which is paired with DL BWP 3), the UE has ambiguity to monitor either DL BWP 1 or DL BWP 2 for potential UL transmission, then the network has to send control for both DL BWP 1 and DL BWP2. In such a case, when UL BWP switching is indicated, a UE may be switched to either DL BWP. Once the UE has received DL BWP 3 switching commands later, the UE may switch the DL BWP again. Alternatively, dedicated pairs may be only allowed and either UL BWP or DL BWP switching may indicate only one paired DL BWP or UL BWP.

When UL grant resources are configured, handling of UL grant resource may be as follows.

Separate grant-free resources may be configured per each configured BWP and the UE may change its grant-free resource when BWP is changed.

Shared grant-free resources may be configured among configured BWPs and the UE's UL BWP may be adjusted to cover both currently active UL BWP and grant-free resources. Any UL BWP configuration and grant-free resources may be within UE's UL RF bandwidth. It means that grant-free transmission may be performed outside of active BWP. In this sense, UE's UL BWP may be configured mainly for resource allocation, not meant for restricting UE's transmission RF bandwidth.

The similar approach for DL SPS may also be considered. That is, separate resource per DL BWP may be configured for SPS, or SPS resource for BWPs may be shared within the UE's capability.

Either approach may be considered. But, if there is no separate configuration of SPS/grant-free resource for a configured BWP, second approach, i.e. shared grant-free resources, may be used. The SPS/grant-free resource configuration for default BWP may be used for SPS resource if it is not configured for a BWP.

Alternatively, if SPS/grant-free resource is not configured for a BWP, the UE may not be required/expected to transmit grant-free when such BWP is activated. Or, in such a case, the UE may go back to a BWP with grant-free/SPS resource is configured.

(9) PUCCH Resource Configuration

While UL BWP is changed in PCell, the resource of PUCCH resources may be changed. As PUCCH resource changes can lead unstable behavior in carriers within the same carrier group, UE's UL BWP or at least set of PUCCH resources may not be changed dynamically when carrier aggregation is configured/activated. This is particularly necessary when different numerologies (particularly carriers with larger subcarrier spacing is aggregated) are used with smaller subcarrier spacing for PUCCH transmission.

In common resource configurations for PUCCH resources among multiple UL BWPs, some nested structure may be considered. For example, PUCCH resources for intra-slot hopping may be constructed based on the smallest UL BWP (sharing the same numerology/subcarrier spacing), and PUCCH resources may be constructed over the larger UL BWP for inter-slot hopping. Intra-slot/inter-slot hopping may be configured per BWP, particularly for PUCCH resources such that for example inter-slot hopping may not be used for small BWP.

Alternatively, to have a nested structure, one common part may be aligned between different BWPs, then the other parts (i.e. hopping parts) may have different frequency location. For example, one UL BWP may consist of PRB 0-50, and the other UL BWP may consist of PRB 0-100. The hopping part for the first UL BWP is 0 then becomes 50, whereas the hopping part for the second UL BWP is 0 then becomes 100. Regardless of BWP changes, the set of resources may be at least partially same and at least one hopping part may be shared between BWPs. Then, the network may receive at least one part regardless of BWP switching success or failure without monitoring both resources.

When intra-slot and inter-slot hopping is used, intra-slot hoppings may occur over K PRBs and/or K RBGs, where K may be defined by the network for a given numerology/subcarrier spacing starting from a PRB index based on common PRB indexing. Intra-slot hopping may occur within K PRBs and/or K RBGs, and inter-slot hopping may occur across K PRBs and/or K RBGs if the configured BWP is larger than 2*K. The inter-slot function across K PRBs and/or K PRGs may be configured, or the offset to be applied for inter-slot across K PRBs and/or RBGs may be configured or the hopping pattern may be configured. By this way, PUCCH transmission within a slot may occur only within K PRBs and/or K RBGs for better multiplexing among different UEs with different BWPs. The UE with higher BWP can enjoy more frequency diversity gain by inter-slot hopping.

Or, intra-slot hopping may occur within K PRBs and/or RBGs, or 2*K PRBs and/or 2*K RBGs, or 4*K PRBs and/or 4*K RBGs ... $2^i$*K PRBs and/or $2^i$*K RBGs depending on the configured BWP. In this case, $2^i$*K PRBs and/or $2^i$*K RBGs may be equal to or smaller than the configured BWP bandwidth. If mirroring approach is used, at least one part may be aligned. Whether it starts from lower frequency in the first hop or higher frequency in the first hop may be configured by the network per BWP configuration or may be determined depending on the frequency location of the configured BWP. When this approach is used, for initial UL BWP, an offset & K may be configured or predefined. The offset may be applied to common PRB indexing where subband division based on K will be started. K may be UE's minimum bandwidth capability or system's minimum bandwidth or prefixed value. Or, K may be larger than the smallest configured BWP's bandwidth. In such a case, hopping may be disabled for that BWP.

A common HARQ-ACK set of resources or PUCCH resources may be configured. HARQ-ACK resources or set of resources referred here may also be used for some other UCI transmission such as CSI feedback.

Intra-hopping frequency band may be configured with m*K, where m may be configured separately per BWP. For example, to multiplex different UEs with different BWP, m may be set as 1. To align UEs with same BWP, m may be configured to the number nearly aligned to the BWP's bandwidth.

It may be discussed what would be the condition to reset the timer. The followings may be considered to reset the timer.

A UE may detects one or more valid scheduling DCI(s) either for unicast PDSCH or PUSCH in unpaired spectrum, unicast PDSCH for paired spectrum in 1 or K slots.
  In terms of SPS, if SPS is to be transmitted in default DL BWP, it is not clear whether reception of SPS should reset the timer. In general, timer may not be reset based on SPS.
  In case of receiving various DCIs (e.g. validation/invalidation of SPS, trigger PRACH, etc.), to minimize BWP switching after SPS validation or during PRACH, the timer may be reset at least for validation DCI of SPS and PRACH trigger.
  In determining default timer, at least validation SPS and PRACH trigger may be counted as a condition to reset the timer.

Between connected mode discontinuous reception (C-DRX) and default timer, DL/UL BWP when C-DRX is performed may be configured. If DL/UL BWP for C-DRX is not configured, currently active DL/UL BWP may be maintained or default DL/UL BWP may be used for C-DRX. Upon DRX, if the UE goes to default DL BWP, timer may be reset. If the UE keeps currently active DL/UL BWP, the timer may be stopped until DRX is ended. If the inactivity timer expires or a UE goes to active state, the UE may reset default timer. In summary, during C-DRX, timer may be stopped. After C-DRX, default timer may be reset.

9. Issue 9: CSI Handling

When BWP switching occurs between DL/UL, CSI handling behavior needs to be clarified. There are three configurations for CSI, i.e. report configuration, RS configuration, and link configuration. The link configuration associates the report configuration with the resource. The associated RS configuration may be used for a given CSI report resource. When CSI report configuration is configured per each UL configured BWP, in terms of linkage, at least one of the followings may be considered.

The link configuration may associates one CSI report from each configured UL BWP with one resource from each configured DL BWP. In other words, for each UL BWP, there may be multiple associated DL BWP's reference resource configurations. Whenever a UE reports CSI feedback, the associated CSI reference resource may be selected from the associated RS configuration in the currently active Dl BWP.
  The link configuration may assume no relationship between BWPs. That is, all CSI related configurations may be not BWP-specific configurations, and a UE may take whatever available resource/report configuration in the current active UL/DL BWP.
  Report configurations from multiple BWPs may be grouped as one report. Multiple RS configurations from multiple BWPs may be grouped as one RS configuration. The link configuration may associate the grouped report configurations and the group RS configurations. For example, one report configuration may include multiple sub-report configurations per each configured UL BWP, and similarly, one RS configuration may include multiple sub-RS configurations per each configured DL BWP. This is similar to the first approach.
  In unpaired spectrum or paired spectrum in which DL/UL BWP pairing is utilized, the link configuration may be configured per each BWP pair. In other words, report/RS/link configurations may be configured per each DL/UL pair.

In terms of CSI measurement, the associated RS with the current report configuration may be valid when the associated DL BWP was valid at the reference resource. In terms of CSI reporting, CSI reporting resource may be valid when the associated UL BWP is active upon reporting, and BWP switching command has been received before n-K, where n is the current time and K is the necessary processing time for UL BWP switching (potentially including CSI processing time). If there was no valid reference resource related to current CSI report resource, a UE may skip CSI reporting.

10. Configuration Details

There are different types of configuration in NR. For example, some parameters may be configured cell-specifically. Some parameters may be configured UE-specifically common for all carriers. Some parameters may be configured UE-specifically for each carrier. Some parameters may be configured UE-specifically for different UL and supplemental UL (SUL). Some parameters may be configured UE-specifically for each BWP. Some parameters may be configured cell-specifically for each BWP.

For each type of configurations, the followings are some examples.

(1) Cell-specific parameters: Parameters for RACH procedure, paging procedure, system information block (SIB) update procedure, etc., may be cell-specific parameters. In addition, in terms of default resource allocation in time/frequency domain, PUCCH resources may be configured cell-specifically.

(2) Cell-specific parameters may be separately configured per each BWP, e.g. initial DL/UL BWP. For example, if the network has multiple SS/PBCH blocks in frequency domain, each SS/PBCH block may be associated with one initial DL/UL BWP and parameters may be applied within its associated initial DL/UL BWP.

If all configurations are applied within initial DL/UL BWP, and if the separately configured bandwidth information exists, the separately configured bandwidth information may be applied with the shared center of initial DL/UL BWP depending on the configuration applied for DL or UL. One example is rate matching pattern. The rate matching pattern in frequency domain may have information on bandwidth and the size of RBs of configuration granularity. When the configuration is given after common PRB indexing is applied, the rate matching pattern may also be indicated with starting PRB index where the configuration is started. Otherwise, the rate matching pattern may be applied locally, or if bandwidth is larger than initial DL/UL BWP, the rate matching pattern may be applied with the shared center as mentioned before. Alternatively, even if common PRB indexing is available, local application within initial DL/UL BWP may always be used for RACH, paging and SIB transmission. In other words, when the UE performs the same operation as in RRC IDLE state, the configurations may be applied only with the configured/indicated initial DL/UL BWP.

Particularly, if the network employs SS/PBCH blocks with different numerologies, the configuration may be applied based on each numerology used in either SS/PBCH block or the associated RMSI.

In terms of numerology applied to each configuration, the following rules may be generally applied.

If the configuration is associated with a specific BWP, the numerology configured for the associated BWP may be used for the configuration.

If the configuration is not associated with a specific BWP, the configuration may have the numerology information. If there is no numerology information in the configuration, the numerology used in SS/PBCH block or the associated RMSI may be used for the configuration as well.

(3) UE-Specific and/or BWP-Specific Configuration

In configurations which are specific to UE and/or BWP, whether the configuration is valid or invalid may be handled as follows.

Option 1: The configurations may be valid only when the associated BWP is active. If the BWP becomes inactive, the configuration may become automatically invalid. For example, semi-persistent scheduling (SPS) configuration may be applied within the active BWP, and it may become automatically invalid once BWP becomes inactive.

Option 2: The configurations may be valid regardless of whether the associated BWP is active or not. However, the configurations may be applied only if the associated BWP is active. When there is MAC control element (CE) or DCI to validate the configuration, the activation message may have BWP index such that certain configuration in a certain BWP can be activated regardless of which BWP is currently active. This may be applied for cross-carrier BWP activation or within the same carrier BWP activation (or the associated configurations' activation/deactivation). With this approach, for example, SPS configuration may become valid or invalid only by explicit indication. For type 1 configuration, the configured resources may become valid once the associated BWP becomes valid. With this approach, the associated BWP or indicated BWP for a certain configuration's activation may not be switched. In other words, the activation message may not switch BWP.

Option 3: The configurations may be valid with certain timer. The configuration may become inactive after the timer expires. For example, a default timer value may be configured whenever the configuration becomes activated. This is to avoid to have very outdated configuration, and allow automatic release of certain configuration.

Option 4: Any configuration may require activation or release of the resources. In terms of some configurations such as frequency hopping, some default scheduling timing, etc., the associated configuration may become effective whenever the new BWP is applied. When cross-BWP scheduling is used or scheduling DCI changes different BWP, the scheduled data's numerology may be used for determining exact time/frequency location for the scheduling data.

Option 5: Activation/deactivation may be used only in the currently active BWP. This is similar to Option 2. However, only activation/deactivation may be done when the associated BWP becomes active. However, even if the BWP is changed, the state of configuration may not be changed unless explicit deactivation has been occurred. In that sense, this option is similar to Option 2 where only configuration may not include BWP index.

Among the options described above, different option may be applied depending on which DCI is used. For example, if activation/deactivation DCI has BWP index, Option 2 may be used. If DCI does not have any BWP index, Option 5 may be used. If there is no UE behavior when BWP is switched, the configurations occurred in the previously available configurations may be remained unless actual deactivation is achieved.

11. DC Handling

As discussed earlier, DC frequency may be signaled or used for two purposes, i.e. one for signal generation, and the other for handling distortion. DC frequency assumed to be as a center for signal generation and actual DC frequency may be separately signaled, if necessary. In general, DC frequency assumed to be as a center for signal generation and actual DC frequency may be same.

In OFDM signal generation, signal may be generated as follows. The time-continuous signal $s_l^{(p,\mu)}(t)$ on antenna port p and subcarrier spacing configuration μ for OFDM symbol l in a subframe for any physical channel or signal except PRACH is defined by Equation 1.

$$s_l^{(p,\mu)}(t) = \sum_{k=0}^{N_{RB}^{\mu} N_{sc}^{RB}-1} a_{k,l}^{(p,\mu)} \cdot e^{j2\pi(k+k_0-N_{RB}^{\mu}N_{sc}^{RB}/2)\Delta f(t-N_{CP,l}^{\mu}T_c)} \quad \text{[Equation 1]}$$

In Equation 1, $0 \le t \le (N_u^{\mu}+N_{CP,l}^{\mu})T_c$ and μ is the subcarrier spacing configuration.

The value of $k_0$ is such that the lowest numbered subcarrier in a carrier resource block for subcarrier spacing configuration μ coincides with the lowest numbered subcarrier in a carrier resource block for any subcarrier spacing configuration less than μ.

The starting position of OFDM symbol l for subcarrier spacing configuration μ in a subframe is given by Equation 2.

$$t_{start,l}^{\mu} \begin{cases} 0 & l = 0 \\ t_{start,l-1}^{\mu} + (N_u^{\mu} + N_{CP,l-1}^{\mu}) \cdot T_c & \text{otherwise} \end{cases} \quad \text{[Equation 2]}$$

The signal may be generated aligned with a common PRB indexing with PRB 0. In other words, all signals are referred to PRB0. However, the signal may be generated only for the configured BWP's bandwidth or active BWP bandwidth. For example, because the UE does not know the bandwidth that the network uses for signal generation, the UE may use $N_{RB}^{\mu}$ as the configured BWP's bandwidth for the active DL BWP. However, the network may generate much larger than that if the network also supports wider bandwidth multiplexed for another UEs.

In this sense, DC frequency used for fast Fourier transform (FFT) operation between the UE and the network may be different if different length for signal generation is used. If DC frequency used at receiver and transmitter is different in inverse FFT (IFFT)/FFT operation, it may lead different phase rotation at each subcarrier, because the DC frequency is different.

This is an issue even for PSS/SSS generation and/or PBCH for SS/PBCH block. For PSS/SSS, DC frequency may be the center of PSS/SSS or left center tone of PSS/SSS. Similarly, for PBCH, left center or right center of SS/PBCH block in frequency may be DC frequency. Alternatively, lowest PRB's subcarrier 0 of SS/PBCH block may be DC frequency for SS/PBCH block signal generation. In this case, it is up to the network to make it sure that the same signal generation at the transmitter side is used. Once a UE acquires information on PRB 0 which is the reference point for a common PRB indexing (this may be indicated as an offset between SS/PBCH block and PRB0, or actual frequency indication), PRB 0's subcarrier 0 may be used as DC frequency. As the center of actual transmission and PRB 0's subcarrier 0 may be different, this gap may need to be handled by digital phase rotator at each symbol. The digital phase rotator at each symbol may compensate frequency difference between actual center and DC frequency such that the signal is transmitted as if the actual center is DC frequency. At the receiver side, the receiver may use the assumed DC frequency. Similarly for UL procedure, initial UL BWP may be used as a reference to determine DC frequency. For example, the lowest PRB subcarrier 0 may be DC frequency for UL transmission. If actual center is different, necessary handling at the UE side may be used. After PRB 0 for UL carrier is also indicated to the UE, PRB 0 for UL carrier may be used as DC frequency.

In summary, PRB 0 reference point used for a common PRB indexing may be used as DC frequency at signal generation in NR. Furthermore, necessary digital rotation at each symbol level may be used to create the signals as if they are transmitted from the assumed DC frequency, i.e. to compensate phase difference between actual center & the assumed DC frequency.

In addition, instead of PRB 0's subcarrier 0, different frequency may be used as DC frequency. The followings are some examples.

Assuming maximum system bandwidth (e.g. 4*276 RBs), a frequency which is left or right center subcarrier of the maximum system bandwidth (where a PRB 0 is the lowest PRB) may be used as DC frequency.

DC frequency may be indicated by RMSI/PBCH. If a reference frequency is configured for UL carrier or SCell, this reference frequency may be used as DC frequency. Or, DC frequency may be derived from this reference frequency based on maximum system bandwidth. In this case, at the reference frequency, all the numerologies may be aligned at subcarrier 0.

DC frequency may be configured UE-specifically. Particularly when PRB 0 is indicated by UE-specific signaling, DC frequency may also be indicated by UE-specific signaling.

The frequency (lowest PRB's subcarrier 0) location of SS/PBCH block that the UE has accessed or indicated frequency in SCell configuration or indicated UL frequency for initial UL BWP may be used as DC frequency. In handling multiple SS/PBCH blocks, a UE may be indicated with frequency offset between the reference/assumed DC frequency. However, this may not be effectively work if multiple SS/PBCH blocks are present in a wideband carrier. So, either the network may use PRB 0's subcarrier 0 or SS/PBCH block's lowest PRB may need to be indicated.

Digital rotator may not be supported depending on UE capability. Thus, the UE needs to indicate whether the UE can compensate the offset between actual DC frequency and virtual DC frequency, i.e. indicated DC frequency. If the UE does not have this capability, the UE may use center frequency of the configured BWP as DC frequency or may explicitly indicate/inform the network about the location.

Information on carrier (center or lowest PRB, the number of RBs for bandwidth) may be indicated either by RMSI or UE-specific signaling. When indicated by RMSI, with different channel bandwidth UEs, multiple list of information may be possible. In this case, the followings may be considered.

RMSI may broadcast a set of {starting PRB, RB bandwidth, numerology} where each set corresponds to a carrier.

When multiple sets are broadcast, a UE may select one carrier which has the largest bandwidth within UE's supporting RF capability with the numerology that the UE supports or numerology based on RMSI.

If there is no such an entry, a UE may select the carrier with numerology same as RMSI.

A UE may be reconfigured with {starting PRB, RB bandwidth, numerology}.

When a UE selects a carrier, the center of the selected carrier may be used as DC frequency.

When a UE is reconfigured, the center of the reconfigured carrier may be used as DC frequency.

This indication may be necessary only if channel raster or synchronization raster is not multiple of resource block bandwidth.

Overall, PRB indexing in a wideband may be summarized as follows. A UE may search SS/PBCH block based on sync/channel raster.

FIG. 14 shows an example of PRB indexing in a wideband according to an embodiment of the present invention. FIG. 14 shows a case that sync/channel raster is multiple of RB bandwidth based on numerology used for SS/PBCH block. In this case, PRB indexing for RMSI may be indicated with offset, if numerology used for RMSI is different from numerology used for SS/PBCH block (particularly, if subcarrier spacing used for RMSI is larger than subcarrier spacing used for SS/PBCH block). If the numerology is same or subcarrier spacing used for RMSI is smaller than subcarrier spacing used for SS/PBCH block, offset may not be necessary. PRB indexing of the given numerology may be created based on SS/PBCH block. In this case, the center of band or carrier may be in the channel/synchronization raster.

Thus, depending on the bandwidth of the band, the center may not be exactly center. In other words, the center location may be floor or ceil of (bandwidth of a band/RB bandwidth/2)*RB bandwidth. In other words, near the half of the bandwidth aligned with PRB indexing based on channel/sync raster may be center of band. Alternatively, as mentioned earlier, the residual offset between center of band, and center of SS/PBCH block may be indicated (i.e. K=mod (bandwidth of a band/2, PRB bandwidth)). In that case, center of a band may be as bandwidth of a band/2-K.

FIG. 15 shows an example of PRB indexing in a wideband according to an embodiment of the present invention. FIG. 15 shows a case that sync/channel raster is not multiple of RB bandwidth based on numerology used for SS/PBCH block. In this case, the offset (floor (bandwidth of a band/2/PRB index)*PRB index) may be added to the center of a band. In other words, the center of a band (for PRB indexing) may be offset+floor (bandwidth of a band/2/PRB index)*PRB index. This is based on the assumption that PRB grid is aligned with center of SS/PBCH block. In this case, the center of a band may be bandwidth of a band/2-K+start frequency of a band.

In either case, if the center of band is used as a reference point for common PRB indexing, common PRB indexing may occur around center of band. The maximum PRB size may be ceil (bandwidth of a band/PRB bandwidth). Common PRB indexing may start from the lowest frequency in the band.

The above concept may be called a virtual center. Depending on the channel/sync raster, the offset to compute virtual center may or may not be indicated. More specifically, the virtual center may be used as DC frequency in signal generation. In different numerology, this information may be indicated by explicit signaling as an offset. If the UE can compute center of a carrier configured and the carrier is configured as {the lowest PRB frequency, RB bandwidth, numerology}, the center may be computed as (RB bandwidth+lowest frequency)/2. For signal generation, it may be on subcarrier 0.

Considering alignment with other numerology, DC frequency may always be aligned at subcarrier 0. Depending on PRB grid formation among different numerologies, for odd PRB numerology, a UE may not know whether it should take subcarrier 0 of PRB k or PRB k+1 when PRB k contains the center. So, it may be used +1 or 0 to find the PRB (or +6 or −6 to change subcarrier). Between subcarrier spacing and subcarrier spacing*4, the center may be in ¼ or ½ or ¾ PRBs. So, depending on the number of PRBs, the offset may be different, e.g. if PRB number is divided by 4, the offset is 0, etc. Similar for this case, a UE may be indicated with 0 or 1.

When a UE performs cancellation, the UE may need to know how to network generates waveform. If waveform is not reset in every symbol by compensating potential different understanding on DC frequency, 1-bit indication indicating whether the center or waveform generation assumption is same between the serving cell and the neighbor cell (in a frequency) may be indicated. If it is indicated as different, the following additional signaling may be considered.

Indication of center frequency of the neighbor cell (it may be configured per frequency); and/or Indication on waveform generation assumption or option (e.g. reset in every OFDM symbol)

In indicating center frequency, the center frequency relative to common PRB 0 of the serving cell may be indicated to minimize additional overhead of indicating larger value or indicating common PRB 0 of the neighbor cell. Or, channel number and/or absolute radio-frequency channel number (ARFCN) may be used.

12. DCI Size Adjustment with DL/UL BWP Switching

In BWP switching, maintaining DCI size among different DL/UL BWPs should be clarified. In a paired spectrum, when DL BWP or UL BWP changes, the associated RA field may also be changed. Particularly when DCI size for DL/UL is aligned, some clarification is needed.

When DL BWP changes, if the DCI size of previous BWP A is k1, and RA field size or DCI size of new BWP B is k2 (DCI size only includes payload), then DCI size of current UL BWP C k3 needs to be aligned with k2. To align k3 and k2, k2 or k3 may be padded to align the sizes between k2 and k3. In other words, without changing of RA field size configured/changed per each UL BWP for UL grant, per each DL BWP for downlink scheduling DCI, DCI size may be aligned by only padding DCI having smaller size between two.

In unpaired spectrum, DCI size of a DL-UL pair may also be aligned UL by padding with different RA size.

When there are UL and SUL associated with a DL, it may also need to align between UL grant for UL, UL grant for SUL, and DL grant for the associated DL. So, the following approaches may be considered.

DCI size or RA field of UL grant may be determined by maximum size of RA field between UL grant for UL and UL grant for SUL in every active BWP. At indicating BWP switching by UL grant at slot n, RA field size may be determined based on the currently active BWPs on UL and SUL.

DCI size alignment between DL and UL may be handled same as the regular carrier case.

Whenever there is BWP switching command on either SUL or UL, RA field size used for UL grant may be adjusted. As mentioned before, maximum size of RA field between two may be selected or the configured size of RA field may be used per each UL BWP, or maximum between configured RA field sizes may be selected.

13. Intra-Band Carrier Aggregation for Bandwidth Adaptation

In a wideband carrier, a network may operate a big wideband whereas the UE is configured with intra-band carrier aggregation. When BWP is adapted for bandwidth adaptation, it needs to be clarified whether BWP adaptation is done per carrier or per aggregated carrier groups. The proposal is to signal a set of carriers as a group.

There may be a primary cell which may be same as PCell if the group includes PCell. Otherwise, some cell may be defined.

If there is BWP switching to a specific BWP index i in this primary cell, all other carriers in the same group (particularly for DL, but may be applied to UL as well) may go to dormant or off state in which a UE is not expected to receive/measurement on SCell. Or, in dormant or off state, only control/data monitoring may be disabled while measurement including CSI measurement may be performed. In other words, only control channel monitoring may be disabled in dormant/off state. Alternatively, a set of BWP which includes {BWP index, carrier index} may be configured which may be switched together with switching to BWP i in primary cell.

In other words, a set of {BWP index, carrier index} may be jointly switched by trigging any BWP change within the set. In other words, all switching of the same set may be triggered simultaneously. BWP may be configured with 'zero' which means that the entire carrier is temporarily off. Similar mechanism may be applied to open up the bandwidth as well.

14. Virtual RB (VRB)-to-PRB Interleaver Design

When interleaver design is applied for a BWP with bandwidth of X, interleaving may occur at the first PRB index k based on a common PRB indexing, where k is the multiple of M and M may be prefixed value (such as 10 RBs). The row or column size may be determined as floor ([highest PRB−k]/P)*M. For example, P may be determined based on system's bandwidth or defined per frequency range or per band.

For example, when P is 50 RBs, and M is 10 RBs, all UEs may align its hopping at 50 RB subbands based on common PRB indexing or based on system bandwidth/PRB grid. If the bandwidth of a configured DL BWP is 100 RBs and starting PRB index is 10, interleaver row/column size is 2*10=20. If there is DL BWP with 50 RBs for another UE in the same frequency region, that UE may have interleaver size of 1*10=10.

The idea is to align starting location with the minimum interleaver size, and then change interleaver size based on the configured bandwidth. M and P may be the same.

In other words, the interleaver size may be aligned with common PRB indexing, and may be applied based on common PRB indexing. If interleaver unit size is 2, interleaving may start from PRB 0 (based on common PRB indexing), which then may indicate more entries than applying interleaver unit size within local BWP. Also, in terms of applying interleaver, when interleaver row size is 2, interleaving may start with odd interleaver unit first based on common PRB indexing. For example, if local BWP starts at PRB 11 with interleaver unit size 2, interleaving may go to 6th interleaver unit and 1 PRB is starting of the BWP. Then interleaving may start from 5th interleaver. In other words, first entry may be filled as NULL. This is to align BWPs with same size with different starting position, or BWP with different size where interleaver unit size is selected accordingly but starting position can be different. The rule is that interleaver unit is applied based on common PRB indexing, and interleaver is applied locally even though the starting position is aligned based on common PRB indexing. Interleaving may always start from odd interleaver unit by adding zero or one NULL point in interleaver (maybe similar approach is applied to the end of interleaver).

FIG. 16 shows a method for performing a random access procedure by a UE according to an embodiment of the present invention. The present invention described above for UE side may be applied to this embodiment.

In step S1600, the UE triggers the random access procedure. In step S1610, when a PRACH resource is not in an active UL BWP, the UE switches the active UL BWP to an initial UL BWP. In step S1620, the UE switches an active DL BWP to an initial DL BWP.

The UE may transmit a PRACH preamble to a network in the initial UL BWP. The UE may receive a RAR as a response to the PRACH preamble from the network in the initial DL BWP.

Furthermore, when the PRACH resource is in the active UL BWP, the UE may select the PRACH resource in the active UL BWP, and transmit a PRACH preamble to a network in the active UL BWP. The UE may switch the active DL BWP to a DL BWP which is paired with the active UL BWP, and receive a RAR as a response to the PRACH preamble from the network in the active DL BWP. The active UL BWP and the active DL BWP may have same index. The PRACH resource in the active UL BWP may be associated with a RAR resource in the active DL BWP.

Furthermore, the PRACH resource may configure a CSS. Information on a RAR may be configured with the PRACH resource.

According to embodiment of the present invention shown in FIG. 16, when a PRACH resource is not in an active UL BWP, the active UL BWP may be switched to an initial UL BWP, and accordingly, the active DL BWP may be switched to an initial DL BWP. Furthermore, when the PRACH resource is in the active UL BWP, and if the active DL BWP is not associated with the active UL BWP, the active DL BWP may be switched to a DL BWP associated with the active UL BWP. Therefore, when UE's configured and/or active BWP is outside of initial BWP, RACH procedure can be clarified.

FIG. 17 shows a UE to implement an embodiment of the present invention. The present invention described above for UE side may be applied to this embodiment.

A UE 1700 includes a processor 1710, a memory 1720 and a transceiver 1730. The processor 1710 may be configured to implement proposed functions, procedures and/or methods described in this description. Layers of the radio interface protocol may be implemented in the processor 1710. Specifically, the processor 1710 triggers the random access procedure, when a PRACH resource is not in an active UL BWP, switches the active UL BWP to an initial UL BWP, and switches an active DL BWP to an initial DL BWP.

The processor 1710 may control the transceiver 1730 to transmit a PRACH preamble to a network in the initial UL BWP. The processor 1710 may control the transceiver 1730 to receive a RAR as a response to the PRACH preamble from the network in the initial DL BWP.

Furthermore, when the PRACH resource is in the active UL BWP, the processor 1710 may select the PRACH resource in the active UL BWP, and control the transceiver 1730 to transmit a PRACH preamble to a network in the active UL BWP. The processor 1710 may switch the active DL BWP to a DL BWP which is paired with the active UL BWP, and control the transceiver 1730 to receive a RAR as a response to the PRACH preamble from the network in the active DL BWP. The active UL BWP and the active DL BWP may have same index. The PRACH resource in the active UL BWP may be associated with a RAR resource in the active DL BWP.

Furthermore, the PRACH resource may configure a CSS. Information on a RAR may be configured with the PRACH resource.

The memory 1720 is operatively coupled with the processor 1710 and stores a variety of information to operate the processor 1710. The transceiver 1730 is operatively coupled with the processor 1710, and transmits and/or receives a radio signal.

The processor 1710 may include application-specific integrated circuit (ASIC), other chipset, logic circuit and/or data processing device. The memory 1720 may include read-only memory (ROM), random access memory (RAM), flash memory, memory card, storage medium and/or other storage device. The transceiver 1730 may include baseband circuitry to process radio frequency signals. When the embodiments are implemented in software, the techniques described herein can be implemented with modules (e.g., procedures, functions, and so on) that perform the functions described herein. The modules can be stored in memory 1720 and executed by processor 1710. The memory 1720 can be implemented within the processor 1710 or external to the processor 1710 in which case those can be communicatively coupled to the processor 1710 via various means as is known in the art.

According to embodiment of the present invention shown in FIG. 17, when a PRACH resource is not in an active UL BWP, the processor 1710 may switch the active UL BWP to an initial UL BWP, and accordingly, switch the active DL BWP to an initial DL BWP. Furthermore, when the PRACH resource is in the active UL BWP, and if the active DL BWP is not associated with the active UL BWP, the processor 1710 may switch the active DL BWP to a DL BWP associated with the active UL BWP. Therefore, when UE's configured and/or active BWP is outside of initial BWP, RACH procedure can be clarified.

FIG. 18 shows a method for performing a random access procedure by UE and BS according to an embodiment of the present invention. The present invention described above for UE side and BS side may be applied to this embodiment.

In step S1800, the UE triggers the random access procedure. In step S1810, when a PRACH resource is not in an active UL BWP, the UE switches the active UL BWP to an initial UL BWP. In step S1820, the UE switches an active DL BWP to an initial DL BWP. In step S1830, the UE transmits a PRACH preamble to a network in the initial UL BWP. In step S1840, the network transmit a RAR as a response to the PRACH preamble to the UE in the initial DL BWP.

Furthermore, when the PRACH resource is in the active UL BWP, the UE may select the PRACH resource in the active UL BWP, and transmit a PRACH preamble to a network in the active UL BWP. The UE may switch the active DL BWP to a DL BWP which is paired with the active UL BWP, and receive a RAR as a response to the PRACH preamble from the network in the active DL BWP. The active UL BWP and the active DL BWP may have same index. The PRACH resource in the active UL BWP may be associated with a RAR resource in the active DL BWP.

Furthermore, the PRACH resource may configure a CSS. Information on a RAR may be configured with the PRACH resource.

According to embodiment of the present invention shown in FIG. 18, when a PRACH resource is not in an active UL BWP, the active UL BWP may be switched to an initial UL BWP, and accordingly, the active DL BWP may be switched to an initial DL BWP. Furthermore, when the PRACH resource is in the active UL BWP, and if the active DL BWP is not associated with the active UL BWP, the active DL BWP may be switched to a DL BWP associated with the active UL BWP. Therefore, when UE's configured and/or active BWP is outside of initial BWP, RACH procedure can be clarified.

FIG. 19 shows a BS to implement an embodiment of the present invention. The present invention described above for BS side may be applied to this embodiment.

A BS 1900 includes a processor 1910, a memory 1920 and a transceiver 1930. The processor 1910 may be configured to implement proposed functions, procedures and/or methods described in this description. Layers of the radio interface protocol may be implemented in the processor 1910. Specifically, when a PRACH resource is not in an active UL BWP, the processor 1910 may control the transceiver 1930 to transmit a RAR as a response to the PRACH preamble to the UE in the initial DL BWP. Furthermore, when the PRACH resource is in the active UL BWP, the processor 1910 may control the transceiver 1930 to transmit a RAR as a response to the PRACH preamble to the UE in the active DL BWP. The active UL BWP and the active DL BWP may have same index. The PRACH resource in the active UL BWP may be associated with a RAR resource in the active DL BWP.

The memory 1920 is operatively coupled with the processor 1910 and stores a variety of information to operate the processor 1910. The transceiver 1930 is operatively coupled with the processor 1910, and transmits and/or receives a radio signal.

The processor 1910 may include ASIC, other chipset, logic circuit and/or data processing device. The memory 1920 may include ROM, RAM, flash memory, memory card, storage medium and/or other storage device. The transceiver 1930 may include baseband circuitry to process radio frequency signals. When the embodiments are implemented in software, the techniques described herein can be implemented with modules (e.g., procedures, functions, and so on) that perform the functions described herein. The modules can be stored in memory 1920 and executed by processor 1910. The memory 1920 can be implemented within the processor 1910 or external to the processor 1910 in which case those can be communicatively coupled to the processor 1910 via various means as is known in the art.

According to embodiment of the present invention shown in FIG. 19, when a PRACH resource is not in an active UL BWP, the active DL BWP may be switched to an initial DL BWP. Furthermore, when the PRACH resource is in the active UL BWP, and if the active DL BWP is not associated with the active UL BWP, the active DL BWP may be switched to a DL BWP associated with the active UL BWP. Therefore, when UE's configured and/or active BWP is outside of initial BWP, RACH procedure can be clarified.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

The invention claimed is:

1. A method for performing a random access procedure by wireless device operating in a wireless communication system, the method comprising:
   activating a first uplink (UL) bandwidth part (BWP) to be an active UL BWP for the wireless device;
   activating a first downlink (DL) BWP to be an active DL BWP for the wireless device;
   based on physical random access channel (PRACH) resources for the random access procedure not being configured in the active UL BWP: (i) switching the active UL BWP from the first UL BWP to an initial UL BWP, and (ii) switching the active DL BWP from the first DL BWP to an initial DL BWP;
   performing a PRACH transmission, to a network, in the active UL BWP which has been switched to the initial UL BWP; and
   receiving, from the network, a random access response in the active DL BWP which has been switched to the initial DL BWP, in response to the PRACH transmission.

2. The method of claim 1, further comprising:
based on a PRACH resource being configured in the active UL BWP which is the first UL BWP:
selecting the PRACH resource in the active UL BWP for the random access procedure.

3. The method of claim 2, further comprising:
switching the active DL BWP from the first DL BWP to a second DL BWP which is paired with the active UL BWP which is the first UL BWP.

4. The method of claim 3, wherein the first UL BWP and the second DL BWP have a same index.

5. The method of claim 2, wherein the PRACH resource in the active UL BWP is associated with a RAR resource in the active DL BWP.

6. The method of claim 2, wherein the PRACH resource configures a common search space (CSS).

7. The method of claim 6, wherein information regarding the random access response is configured with the PRACH resource.

8. The method of claim 1, wherein the wireless device is in communication with at least one of a mobile device, a network, or autonomous vehicle, other than the wireless device.

9. The method of claim 1, wherein the initial UL BWP and the initial DL BWP are configured based on system information received from the network.

10. The method of claim 1, further comprising:
receiving, from the network, PRACH resource configuration information that configures the PRACH resources.

11. The method of claim 1, wherein the first UL BWP is different from the initial UL BWP, and
wherein the first DL BWP is different from the initial DL BWP.

12. A wireless device configured to operate in a wireless communication system, the wireless device comprising:
a transceiver;
at least one processor; and
at least one computer memory operably connected to the at least one processor and storing instructions that, based on being executed by the at least one processor, perform operations comprising:
activating a first uplink (UL) bandwidth part (BWP) to be an active UL BWP for the wireless device;
activating a first downlink (DL) BWP to be an active DL BWP for the wireless device;
based on physical random access channel (PRACH) resources for a random access procedure not being configured in the active UL BWP: (i) switching the active UL BWP from the first UL BWP to an initial UL BWP, and (ii) switching the active DL BWP from the first DL BWP to an initial DL BWP;
performing a PRACH transmission, to a network, in the active UL BWP which has been switched to the initial UL BWP; and
receiving, from the network, a random access response in the active DL BWP which has been switched to the initial DL BWP, in response to the PRACH transmission.

13. The UE of claim 12, wherein the operations further comprise:
based on a PRACH resource being configured in the active UL BWP which is the first UL BWP:
selecting the PRACH resource in the active UL BWP for the random access procedure.

14. The UE of claim 13, wherein the operations further comprise:
switching the active DL BWP from the first DL BWP to a second DL BWP which is paired with the active UL BWP which is the first UL BWP.

15. The UE of claim 14, wherein the first UL BWP and the second DL BWP have a same index.

* * * * *